US012358656B2

(12) United States Patent
Jeffrey et al.

(10) Patent No.: US 12,358,656 B2
(45) Date of Patent: Jul. 15, 2025

(54) SYSTEM FOR A MODULAR SATELLITE TESTING PLATFORM

(71) Applicant: Sidus Space, Inc., Merritt Island, FL (US)

(72) Inventors: Ryan Jeffrey, Cocoa, FL (US); Carol Craig, Merritt Island, FL (US); Anthony Boschi, Merritt Island, FL (US)

(73) Assignee: Sidus Space, Inc., Merritt Island, FL (US)

(*) Notice: Subject to any disclaimer, the term of this patent is extended or adjusted under 35 U.S.C. 154(b) by 226 days.

(21) Appl. No.: 17/828,233

(22) Filed: May 31, 2022

(65) Prior Publication Data
US 2023/0406548 A1 Dec. 21, 2023

(51) Int. Cl.
*B64G 1/10* (2006.01)
*B64G 1/22* (2006.01)
*B64G 1/44* (2006.01)
*B64G 1/66* (2006.01)
*B64G 7/00* (2006.01)

(52) U.S. Cl.
CPC ............... *B64G 7/00* (2013.01); *B64G 1/10* (2013.01); *B64G 1/223* (2023.08); *B64G 1/443* (2013.01); *B64G 1/66* (2013.01)

(58) Field of Classification Search
None
See application file for complete search history.

(56) References Cited

U.S. PATENT DOCUMENTS 3,473,602 A * 10/1969 Boyle ............... B64G 1/50
165/133
5,755,406 A * 5/1998 Aston ............... B64G 1/1007
244/159.4

(Continued)

FOREIGN PATENT DOCUMENTS

WO 2016/097955 A1 6/2016
WO 2017/069816 A1 4/2017

OTHER PUBLICATIONS

International Search Report from the International Search Authority for international application No. PCT/US2023/067684 mail dated Sep. 18, 2023.

(Continued)

*Primary Examiner* — Joshua J Michener
*Assistant Examiner* — Colin Zohoor
(74) *Attorney, Agent, or Firm* — Mark Malek; Jonathan D. Staudt; Widerman Malek, PL

(57) ABSTRACT

A modular satellite testing platform system having an upper and a lower member along with a plurality of support members, intermediate members, and lower bar members that are interconnected to the upper member and the lower member. The system further includes a plurality of shelf members that are attached to the support members. The satellite also includes a plurality of bottom cover members that are attached to the lower member by a plurality of hinge members that allow the cover members to selectively rotated about an axis to be rotatably translated between an opened position and a closed position. The system yet further includes a thermal control system to allow maintaining the thermals of the satellite as desired.

25 Claims, 21 Drawing Sheets

(56) References Cited

U.S. PATENT DOCUMENTS

| | | | | |
|---|---|---|---|---|
| 6,206,327 | B1* | 3/2001 | Benedetti | B64G 1/10 |
| | | | | 244/159.4 |
| 10,536,107 | B1* | 1/2020 | Ning | B64G 1/443 |
| 2002/0179775 | A1* | 12/2002 | Turner | B64G 1/402 |
| | | | | 244/172.5 |
| 2007/0029446 | A1 | 2/2007 | Mosher | |
| 2009/0196986 | A1* | 8/2009 | Cordaro | B64G 1/226 |
| | | | | 427/126.3 |
| 2019/0023423 | A1* | 1/2019 | Grübler et al. | B64G 1/10 |
| 2019/0367194 | A1* | 12/2019 | Oh | H05K 3/366 |
| 2021/0331431 | A1* | 10/2021 | Smith | B29C 70/42 |
| 2022/0017238 | A1 | 1/2022 | Mehra | |

OTHER PUBLICATIONS

Written Opinion from the International Search Authority for international application No. PCT/US2023/067684 mail dated Sep. 18, 2023.

* cited by examiner

SYSTEM FOR A MODULAR SATELLITE TESTING PLATFORM

FIELD OF THE INVENTION

The present invention relates to modular satellite testing platform systems. Specifically, the present invention is related to a modular satellite having a configurable design using three-dimensional (3D) composite printing of components and including a thermal control system, multi-layered insulation, and paints with thermal properties.

BACKGROUND OF THE INVENTION

In general, there is a need within the satellite industry by researchers who specialize in satellite subsystem design who do not have the expertise to design, integrate, launch and operate a satellite. There is a need to be able to test hardware and give flight heritage without worrying about how to design and build an entire satellite. This creates a need for a modular satellite wherein researchers can be provided a simple interface for power and data and handover their payload to a company for on-orbit testing and/or operation and that company returns the vital data. Moreover, there is a demand for satellites to be made of a lighter material in order to reduce the cost of launching it into orbit.

Traditionally satellites use lighter metals, such as aluminum, as the main material to construct the components of a satellite. These lighter metals have a well understood reaction to thermal changes and electrical conductivity. However, using these traditional materials in manufacturing satellite structures requires long periods of planning, testing, and lead times to create a finished product to fulfill a purchaser's order to the purchaser's chosen specifications.

In light of the above deficiencies in the prior art, a solution is needed that provides a modular satellite testing platform with shorter lead times and using components that are lower in cost and weight while still allowing for customization by a purchaser that performs the same or better as the traditional materials. Furthermore, a solution is needed to implement a new material to be used as the structure of a satellite exposed to the vacuum of space given the different electrical conductivity and thermal transfer properties of the new material.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

The present invention addresses the deficiencies in the prior art by providing a modular satellite testing platform system that greatly reduces lead times, weight, and cost, and that also advantageously allows for configuration by a purchaser.

With the above in mind, embodiments of the present invention are related to a modular satellite testing platform that may include an upper member, a lower member, intermediate members, lower support members, upper support members, upper cover members and lower bar members. The modular satellite testing platform may further include hinge members, bottom cover members, shelf members, and a thermal control system.

The intermediate members may be positioned between the upper member and the lower member with the lower support members connected to and extending between the lower member and the intermediate members, and the upper support members connected to and extending between the upper member and the intermediate members.

The upper cover members may each be adapted to extend between an adjacent pair of upper support members. The lower bar members may be connected to and extend between the lower support members and affixed to the lower members and/or the lower support members.

The hinge members may be connected at one end to the lower member and/or the lower bar members. The bottom cover members may be connected to the hinge members at the other end, opposite from the connection to the lower member and/or the lower bar members. The hinge members are configured to rotate about a rotational axis thereof, causing the bottom cover members to be rotatably translated between an opened position and a closed position.

The shelf members may be connected to and carried by the lower support members, upper support members, and/or the intermediate members. The thermal control system may be used to monitor, notify, and control the thermals of the system.

The system may include the upper member, lower member, intermediate members, lower support members, upper support members, upper cover members, lower bar members, hinge members, bottom cover members, and shelf members being made by continuous fiber fabrication (CFF) three-dimensional (3D) printing with micro-carbon fiber filled nylon composite material filament.

The system may include a power unit that may include one or more power generators, one or more power storage units, a power management system, and a power distribution system. The system may further include a communications system that is in communication with the satellite antenna where the communications system may include a wireless communication control system and a transceiver that is positioned in communication with the wireless communication control system.

The configuration of the upper member and the lower member may be octagonal in shape. The system may further include a satellite antenna that may be connected to the upper member. The system may also include photovoltaic members connected to the interior surface or exterior surface of the bottom cover members. The photovoltaic members may be configured to be electrically connected to and in communication with power storage units onboard the system where the photovoltaic members may be operable to charge the power storage units.

The system may still further include a navigation system in communication with the satellite antenna, where the navigation system may include a global positioning satellite transceiver, a transponder, a star tracker, a reaction wheel, and a magnetorquer. The system may also include a propulsion system that may include a thruster and a number of pressure tanks. The system may include one or more cameras. The camera may be provided by an infrared camera and/or a visible light camera. The camera may be placed in communication with on board data storage to store images and/or video collected by the camera.

The system may further include multilayer insulation that is used throughout the apparatus to increase regulation and control over temperatures of the satellite testing platform system and a thermal coating painted onto various components of the system to further increase regulation and control over the temperatures. The system may yet further include the lower member being configured to be handled by a space deployment arm. The thermal control system may further include heatsinks, heaters, and/or radiators.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
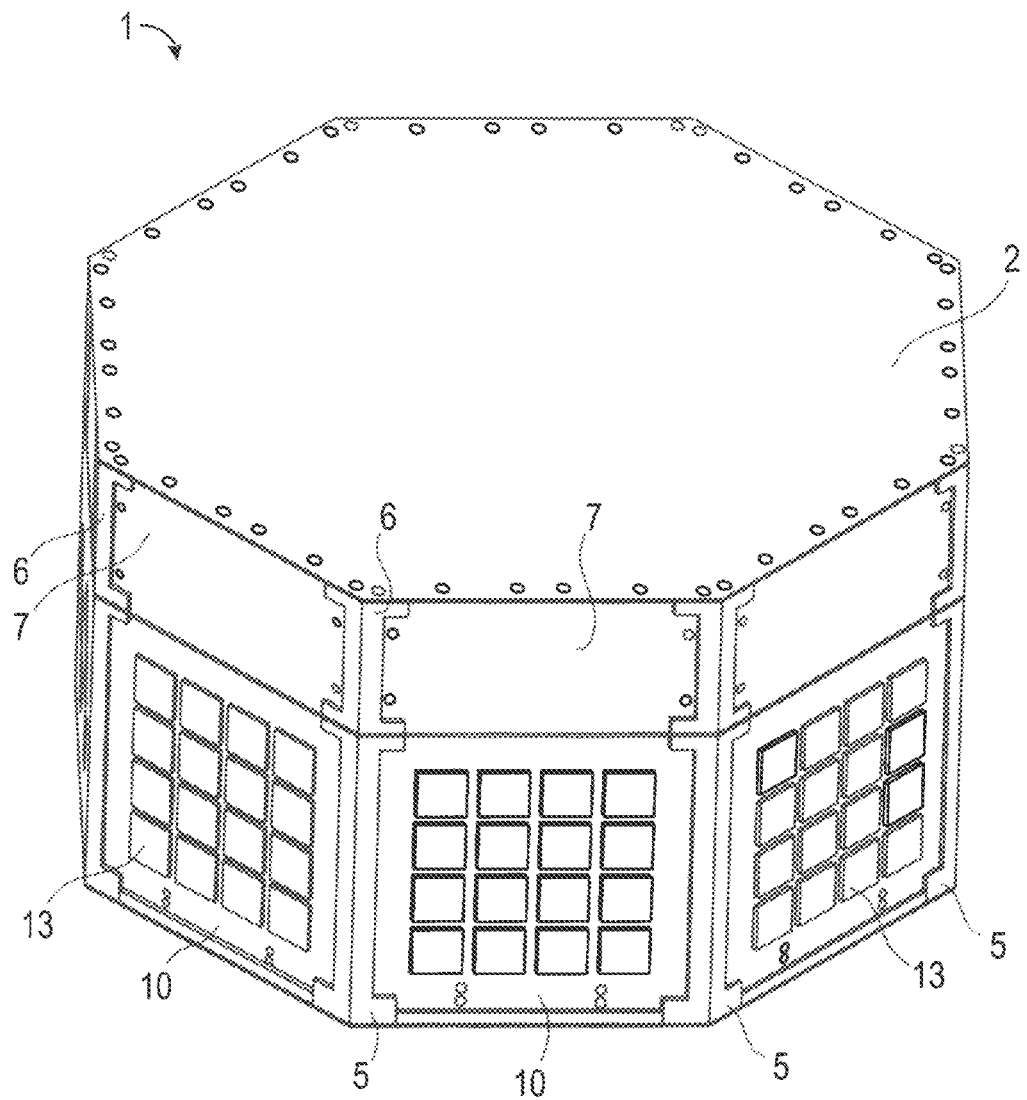
FIG. 1 is a perspective view of a modular satellite testing platform system according to an embodiment of the present invention with a plurality of bottom cover members in a closed position.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a modular satellite testing platform system 1 for housing payloads that may be installed in the system 1 to be sent into the orbit of earth for monitoring, testing, and data collection about the payload's exposure to the harsh environment of space and other readings of anomalies, phenomena, and objects visible from space via a variety of instruments and devices onboard the system.

Referring now to FIGS. 3-4 and 15-21, a modular satellite testing platform system 1 according to an embodiment of the invention is presented. The system 1 may comprise of an upper member 2, a lower member 3, and a plurality of intermediate members 4. The intermediate members may be positioned between the upper member 2 and the lower member 3. The upper member 2, the lower member 3, and the plurality of intermediate members 4 may have a horizontal configuration, i.e., the upper member 2, the lower member 3 and the intermediate members 4 may all be configured in the same plane. The system 1 may also comprise of a plurality of lower support members 5, a plurality of upper support members 6, and a plurality of lower bar members 8. The lower support members 5 may be connected to and extend between the lower member 3 and the intermediate members 4. More specifically, the lower support members 5 may have a configuration that is substantially normal to the lower member 3 and the plurality of intermediate members 4. The plurality of upper support members 6 may be connected to and extend between the intermediate members 4 and the upper member 2. The plurality of upper support members 6 may have a configuration that is substantially normal to the plurality of intermediate members 4 and the upper member 2. The plurality of lower bar members 8 may be connected to and extend between a pair of the lower support members 5. More specifically, one of the plurality of lower bar members 8 extends between a pair of lower support members 5. Further, the plurality of lower bar support members 8 are configured normal to the lower support members 5 and in a parallel configuration to the lower member 3. The lower bar members 8 may be affixed to either the lower member 3 or the lower support members 5, or both the lower member 3 and the lower support members 5.

Figure 2:
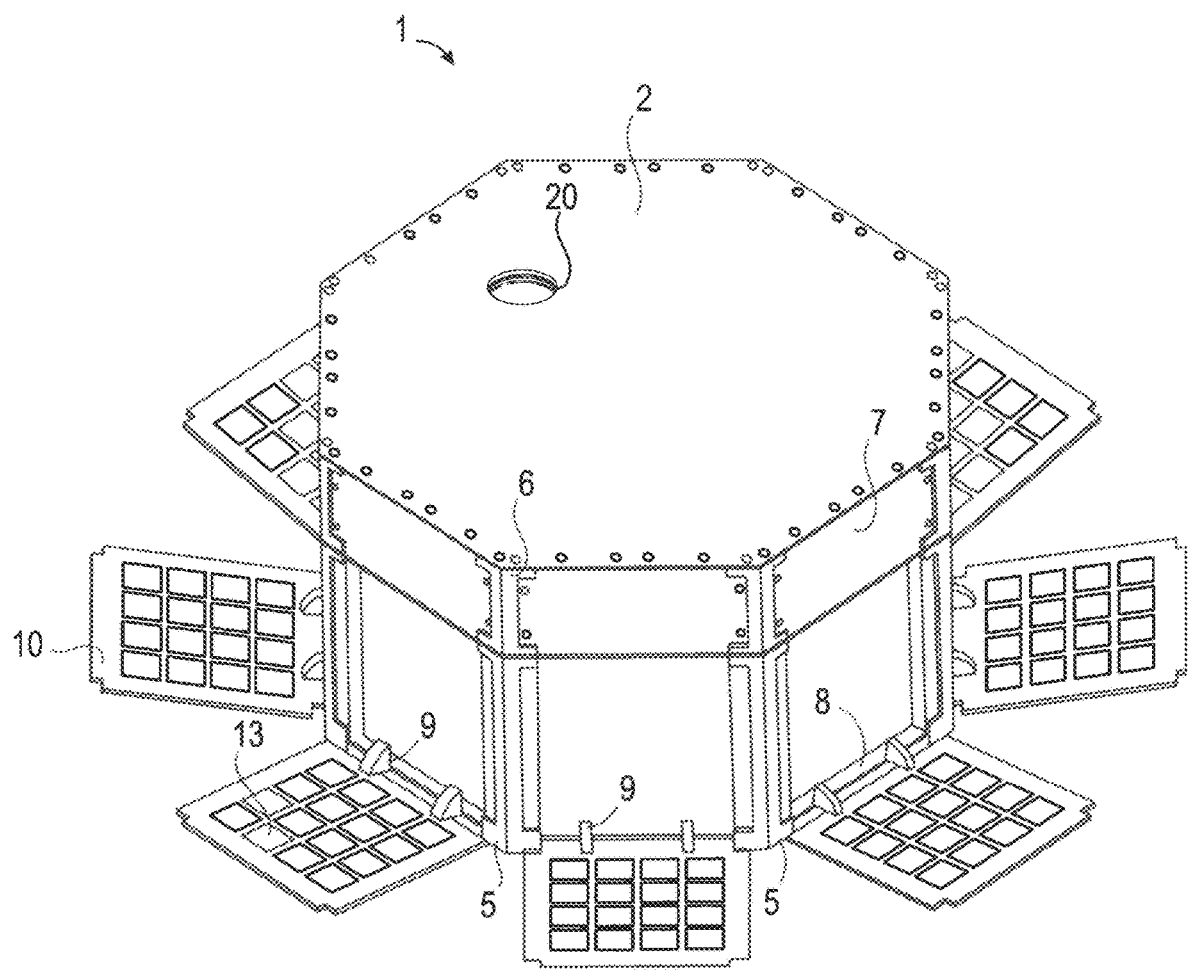
FIG. 2 is a perspective view of the modular satellite testing platform system of FIG. 1 and having the plurality of bottom cover members in an opened position.
Figure 17:
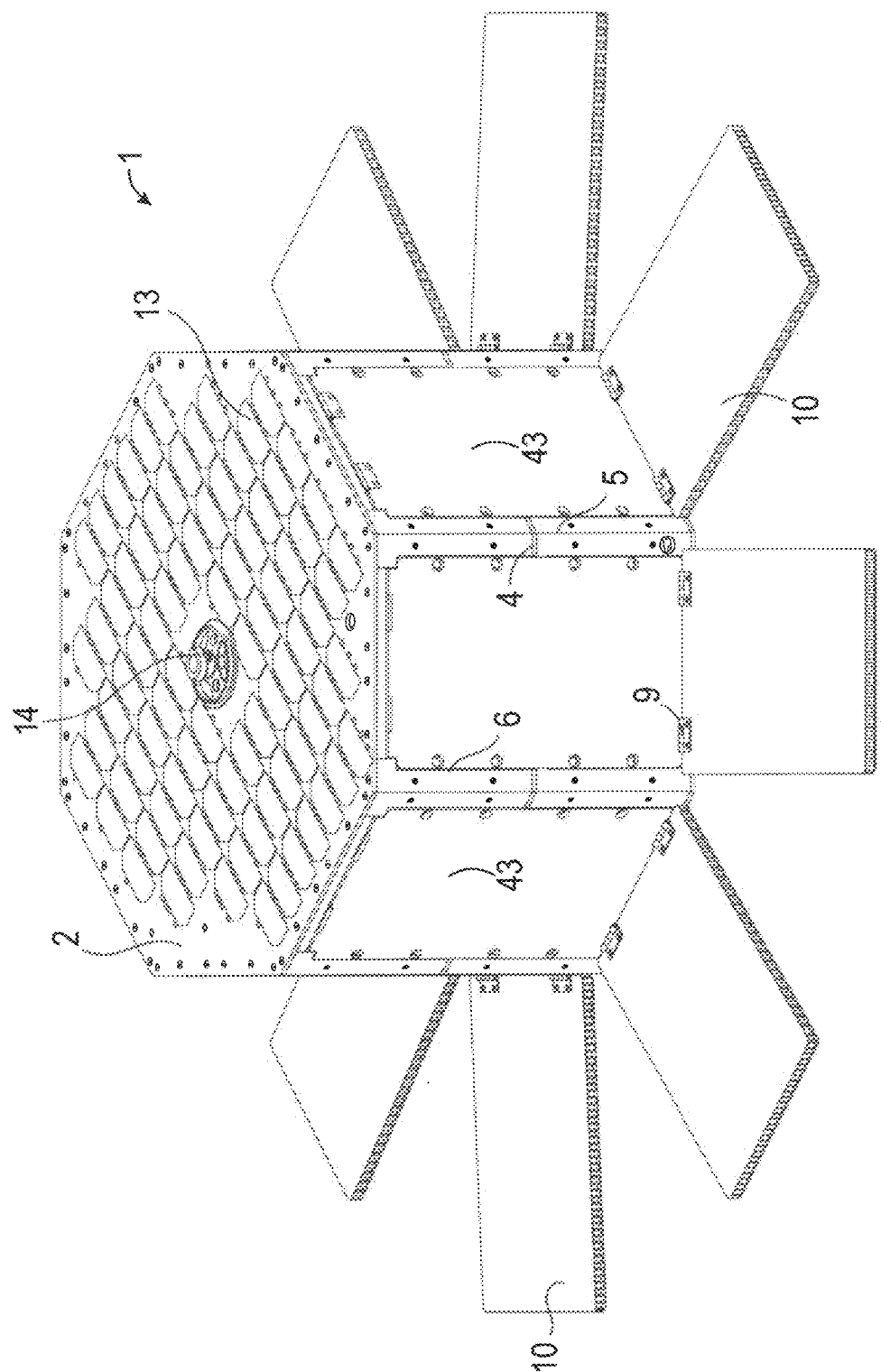
FIG. 17 is a perspective view of a modular satellite testing platform system including photovoltaic members and an attachment member located on an upper member and showing the plurality of lower cover members in the opened position, according to an embodiment of the present invention.
Figure 18:
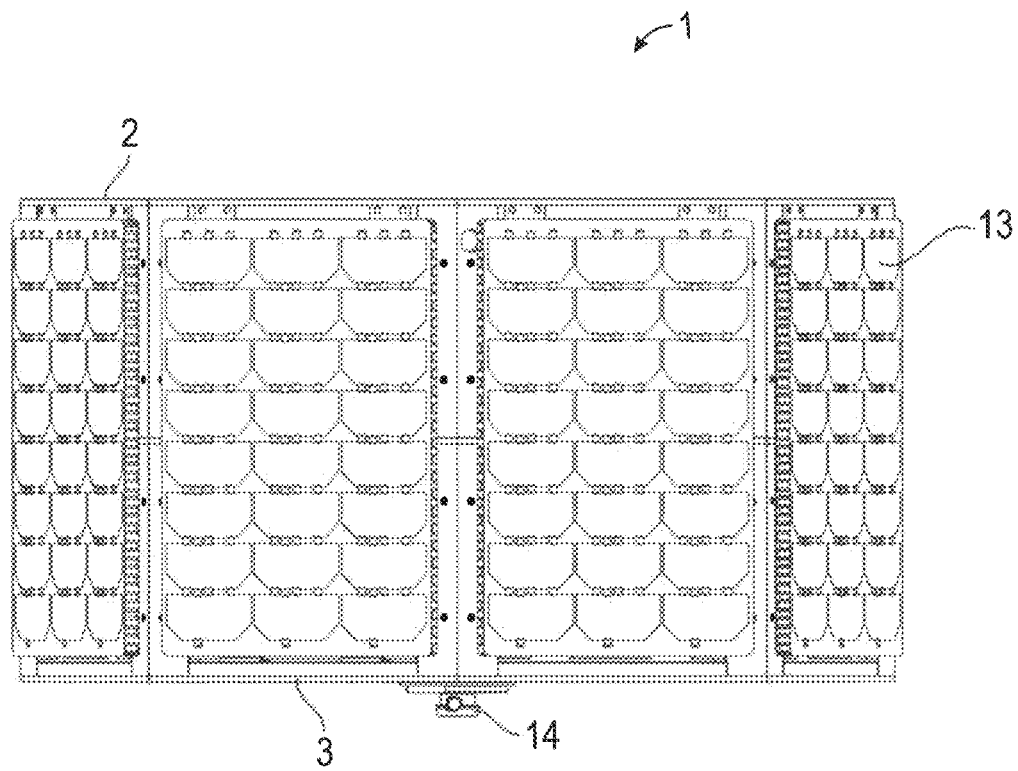
FIG. 18 is a side elevation view of a modular satellite testing platform system showing the bottom cover members in the closed position according to an embodiment of the present invention.
Figure 21:
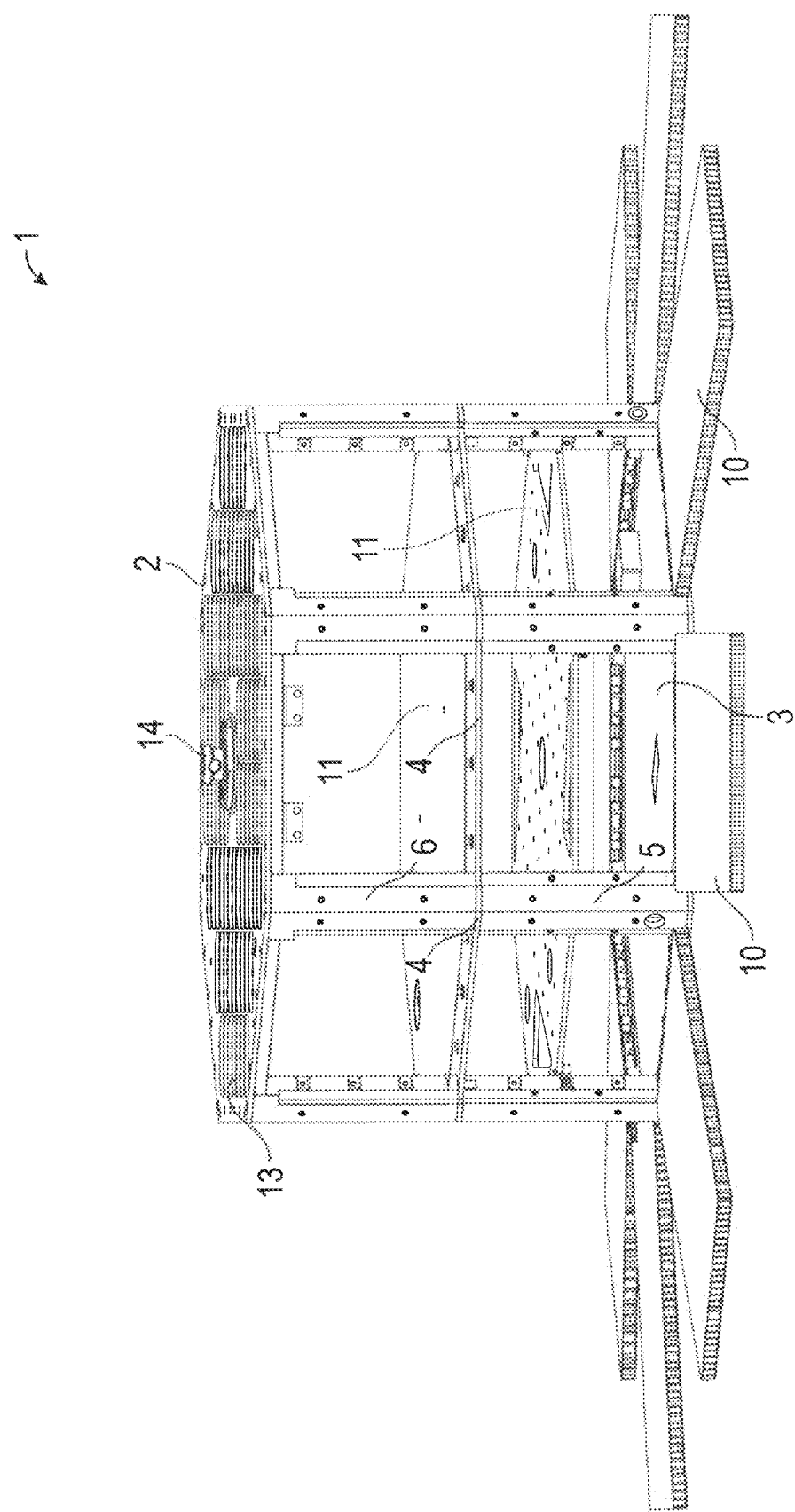
FIG. 21 is a perspective view of the modular satellite testing platform system of FIG. 17 having the cover members removed therefrom.

Now specifically referring to FIGS. 2, 17, and 21, the system 1 may further comprise of a plurality of hinge members 9 and a plurality of bottom cover members 10. The hinge members 9 may be affixed to the lower member 3 and/or the lower bar members 8. The system 1 may also comprise a plurality of bottom cover members 10 that may be affixed to one end of the hinge members 9. In FIG. 2, the bottom cover members 10 are shown in an opened position. In FIG. 1, the bottom cover members 10 are shown in a closed position. The bottom cover members 10 are moveable between the opened position and the closed position. As illustrated, the closed position of the bottom cover members 10 is defined as the bottom cover members 10 being in a position to enclose interior portions of the system 1, and the opened position of the bottom cover members 10 is defined as the bottom cover members 10 being in a position so that interior portions of the system 1 are exposed and/or accessible. Those skilled in the art will appreciate that the open position may also include any position of the bottom cover members 10 where the interior portions of the system 1 are significantly exposed, and the closed position may include any position of the bottom cover members 10 where the interior portions of the system are significantly unexposed.

As perhaps best illustrated in FIGS. 1-6, the system 1 may comprise of a plurality of upper cover members 7 that may be connected to and extending between an adjacent pair of upper support members 6. The upper cover members 7 may be attached to the upper support members 6, intermediate members 4, and/or the upper member 2.

Figure 3:
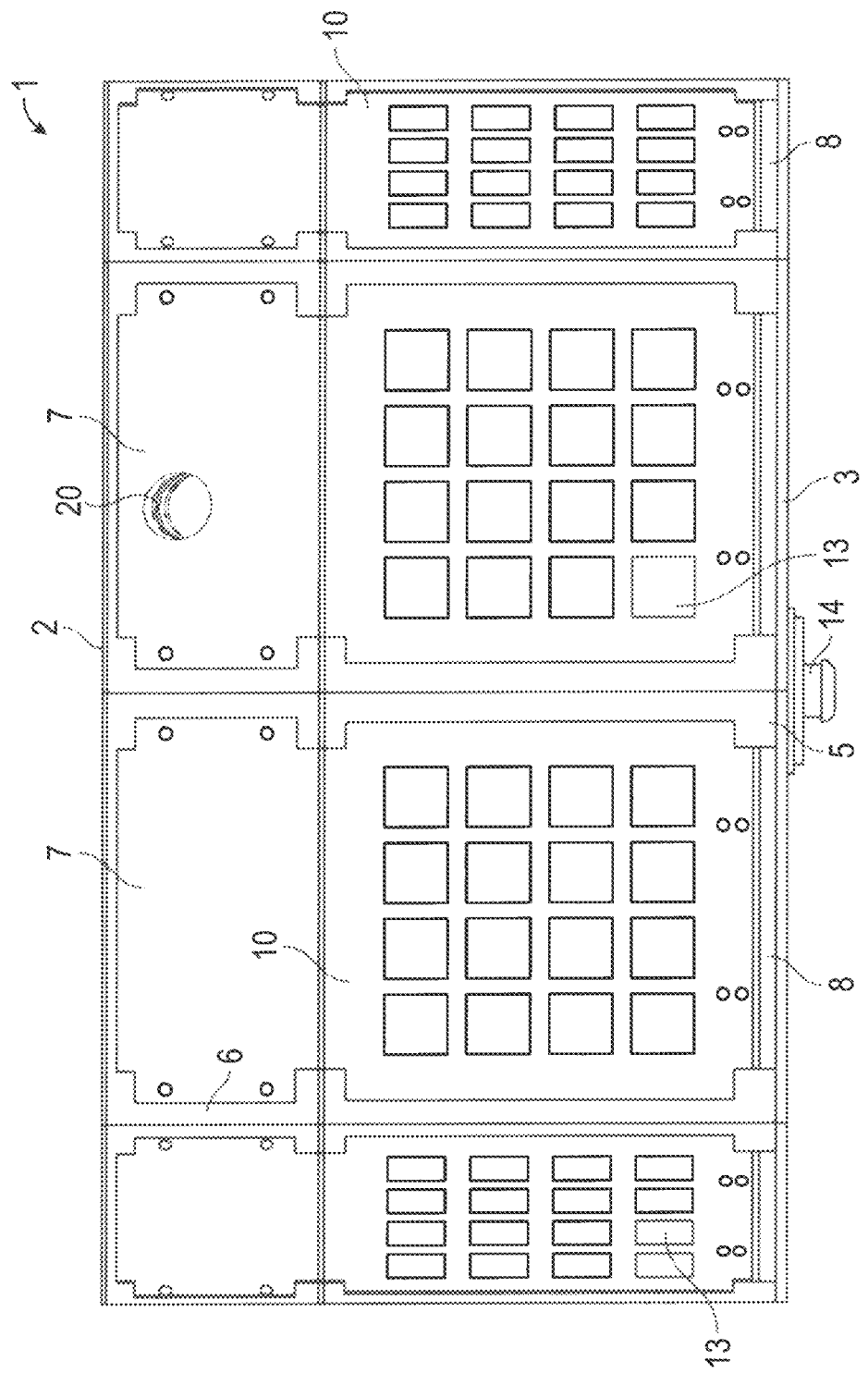
FIG. 3 is a side elevation view of the modular satellite testing platform system of FIG. 1.
Figure 4:
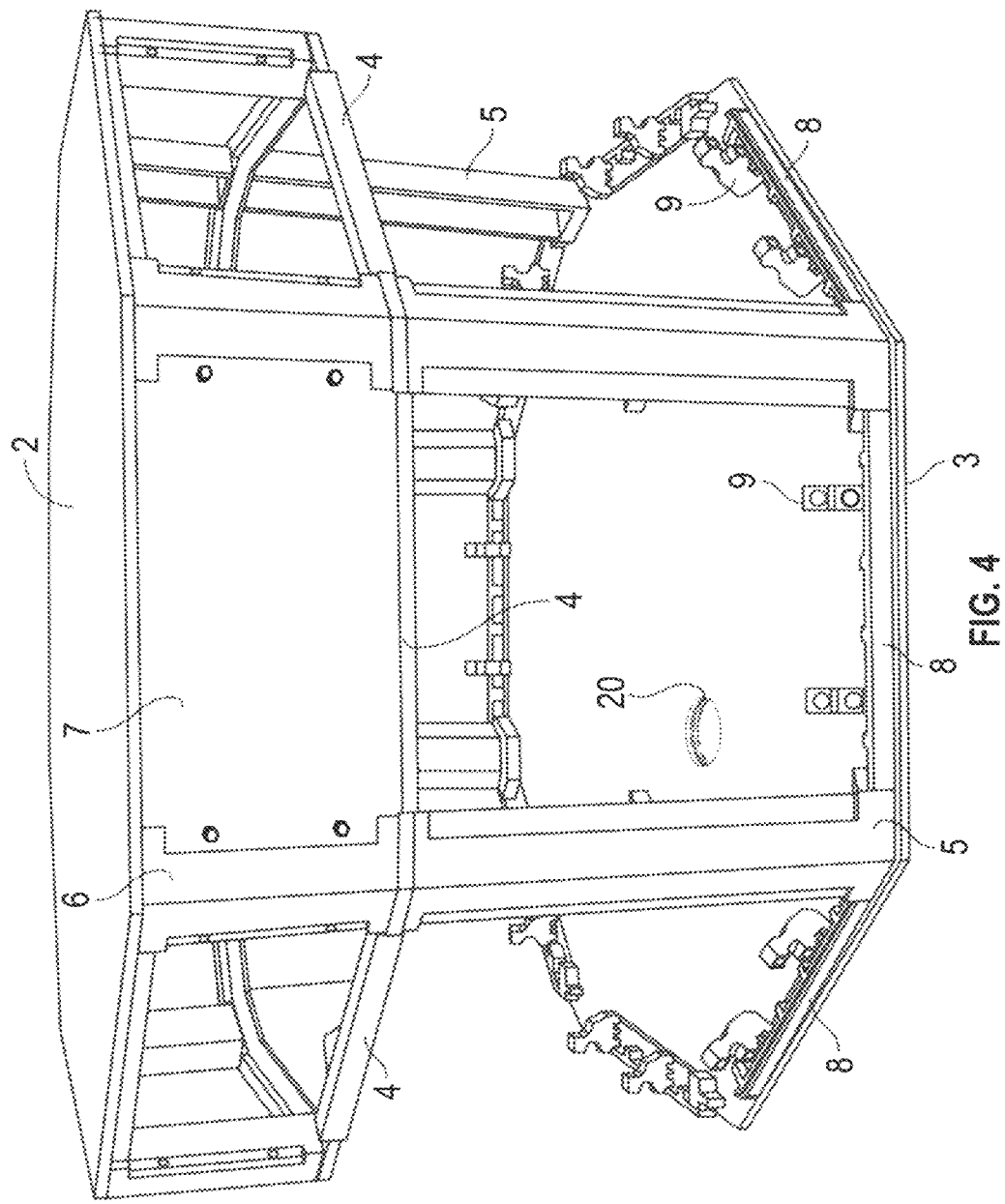
FIG. 4 is a perspective side view of the modular satellite testing platform system of FIG. 3 showing inner areas thereof.
Figure 5:
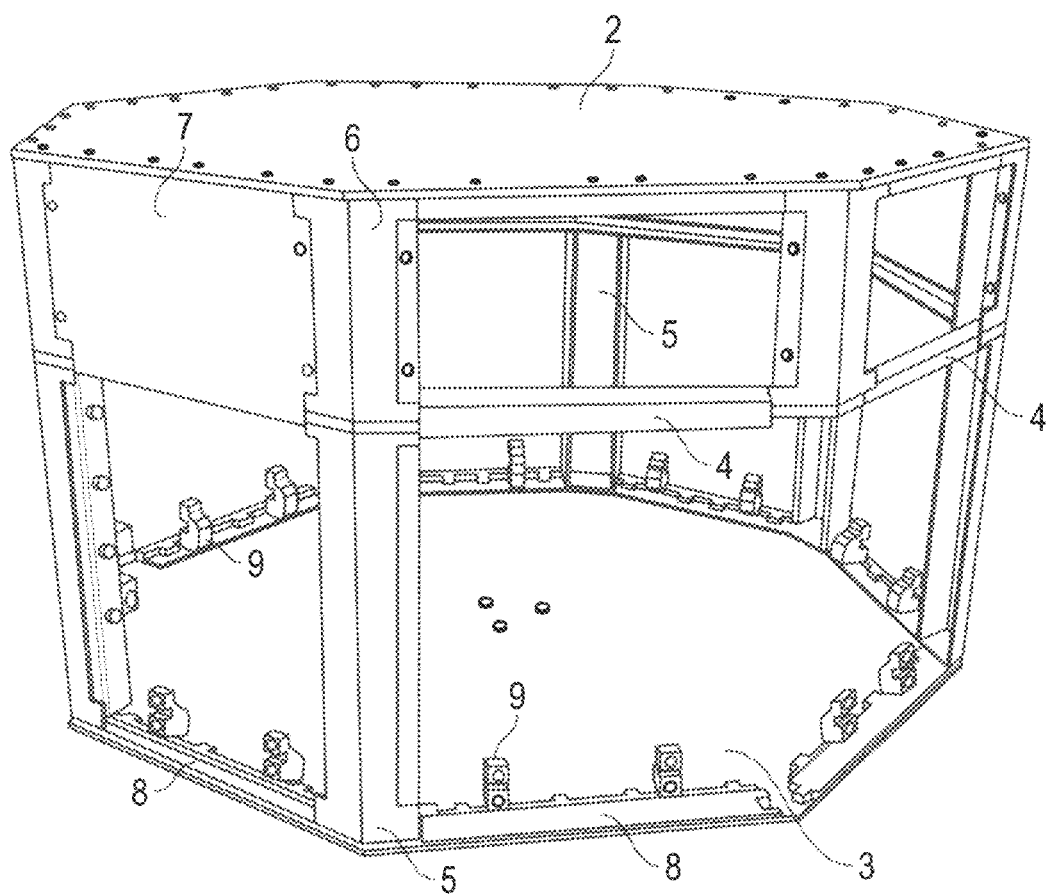
FIG. 5 is another perspective view of the modular satellite testing platform system of FIG. 4.

Referring now to FIGS. 3-5, the system 1 may include a plurality of lower bar members 8. The lower bar members 8 may be configured to extend between the lower support members 5 and be connected to the lower support members 5 and/or the lower member 3.

Figure 9:
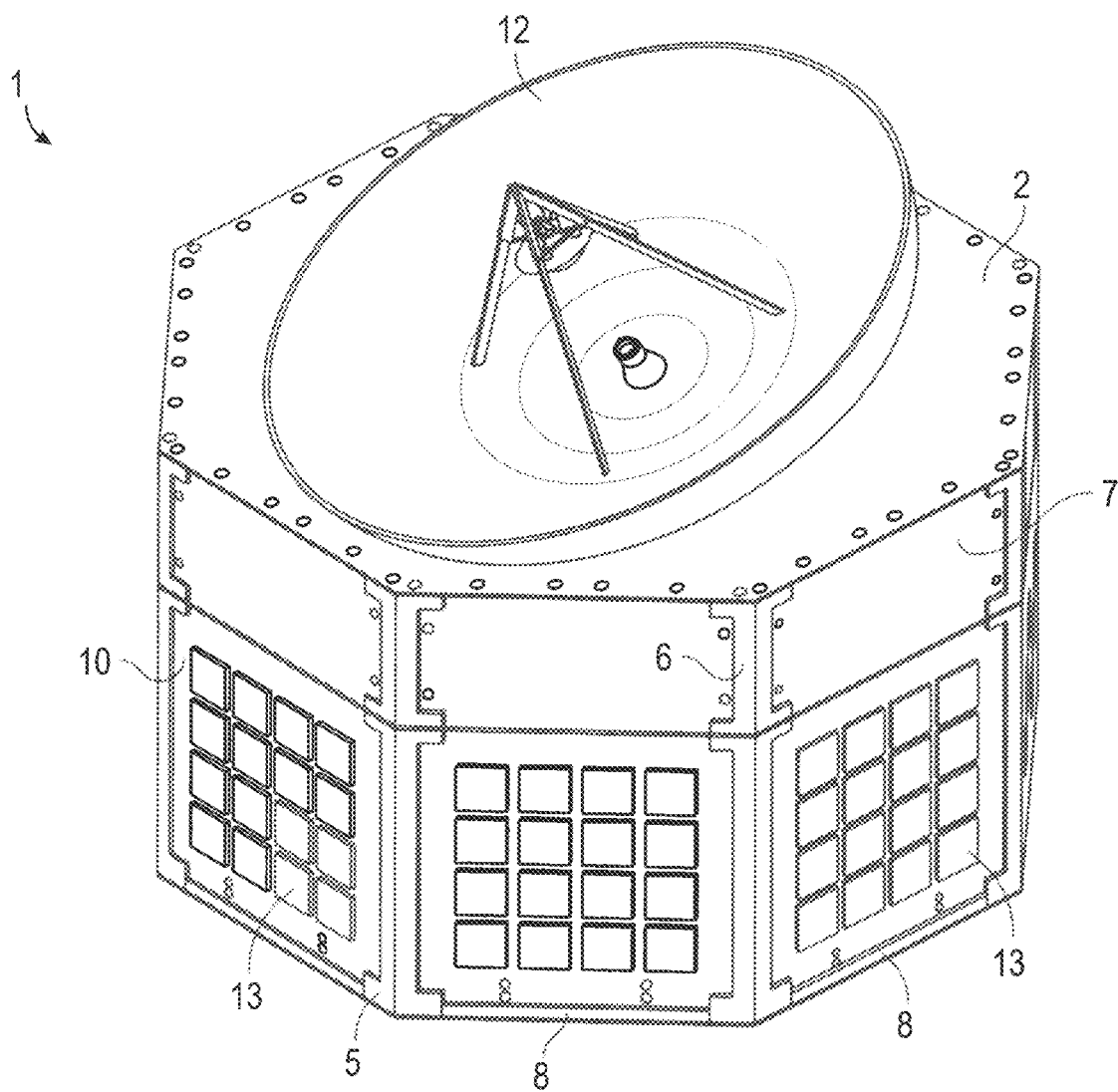
FIG. 9 is a perspective view of the modular satellite testing platform system of FIG. 1 and having a satellite antenna connected to a top portion thereof.

Referring now to FIG. 9, the system 1 may comprise an antenna 12 that may be attached to an outside face of the upper member 2. The antenna 12 depicted in FIG. 9 is a satellite dish type of antenna, but those skilled in the art will appreciate that the antenna 12 may be provided by any type of antenna such as, for example, a wire antenna, a horn antenna, a reflector antenna, an array antenna, a parabolic reflector antenna, a parabolic reflector antenna with offset feed, a double reflector antenna, a shaped reflector antenna, a conical horn antenna, or any other type of antenna as may be understood by those skilled in the art. The antenna 12 may be configured to be in communication with other devices (not shown) to send and receive computer readable information, data, and/or code. The other devices may include, but are not limited to, personal computers, tablet computers, communication towers, other satellites, antennas, cellular devices, radio communication devices, or other devices capable of wireless communication with the antenna 12 as may be understood by those skilled in the art. The antenna 12 may be configured to facilitate communication by a wide range of mediums of information transfer, including but not limited to radio waves, microwaves, visible light, or infrared waves. Those skilled in the art will notice and appreciate that a wide range of mediums of information transfer may be used for the communication configuration of the antenna 12 while accomplishing all the goals, features, and advantages of the present invention. Further details about the antenna 12 are given below.

Figure 6:
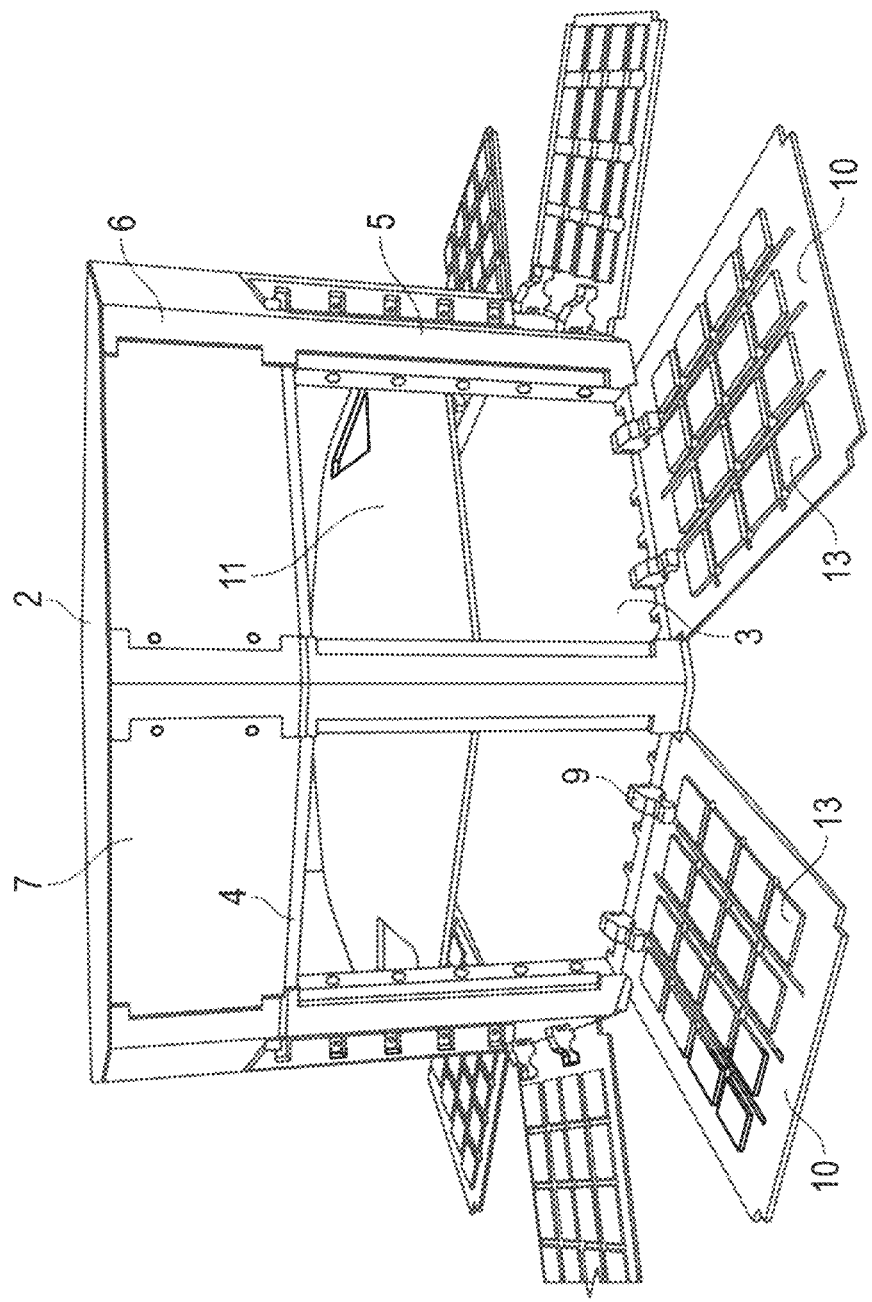
FIG. 6 is a side perspective view of the modular satellite testing platform system of FIG. 1 and showing the plurality of bottom cover members in the opened position.
Figure 7:
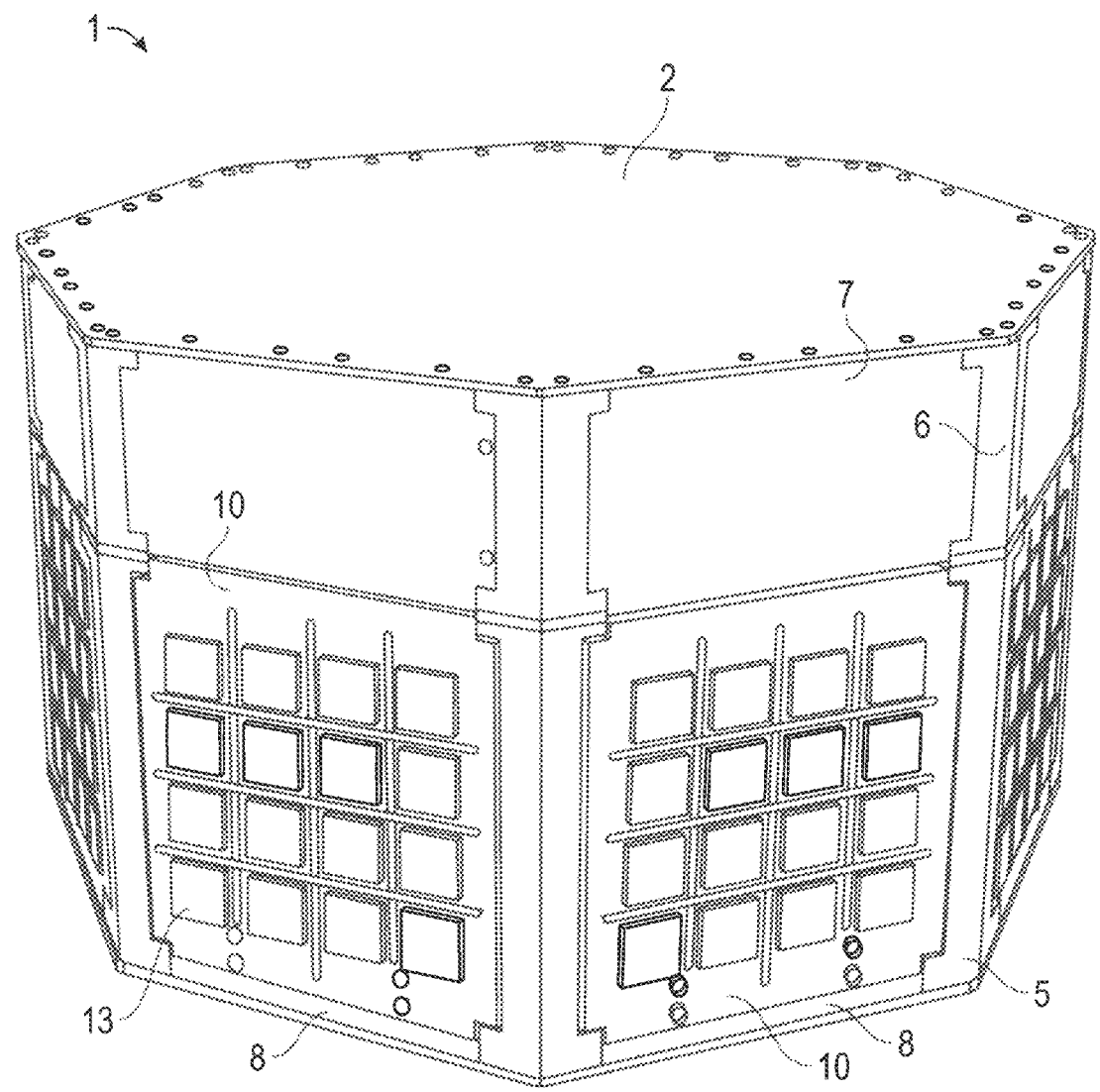
FIG. 7 is a side perspective view of the modular satellite testing platform of FIG. 1 and showing the plurality of bottom cover members in the closed position.
Figure 8:
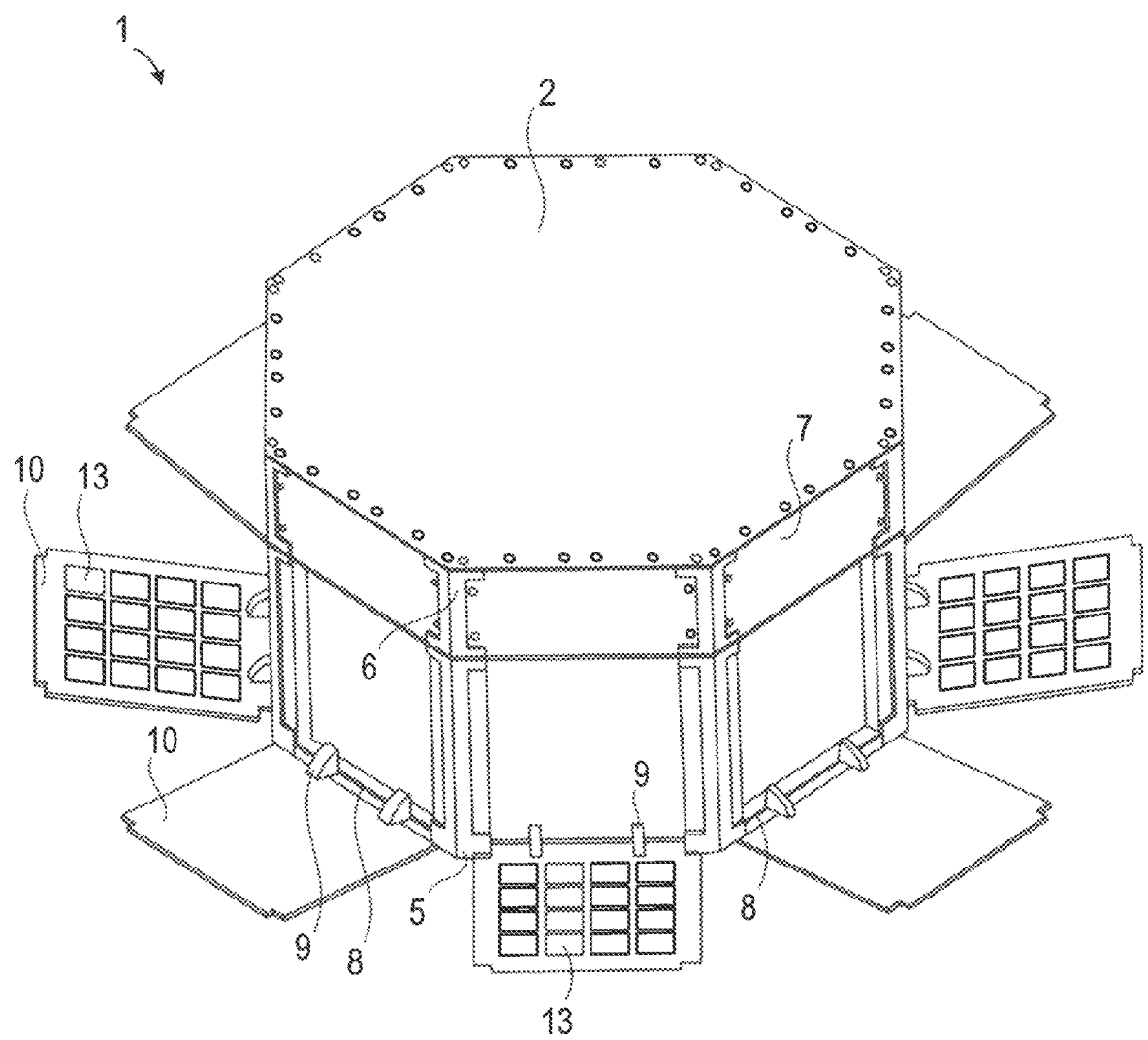
FIG. 8 is another side perspective view of the modular satellite testing platform system of FIG. 1 with photovoltaic members on every other of the bottom cover members.
Figure 20:
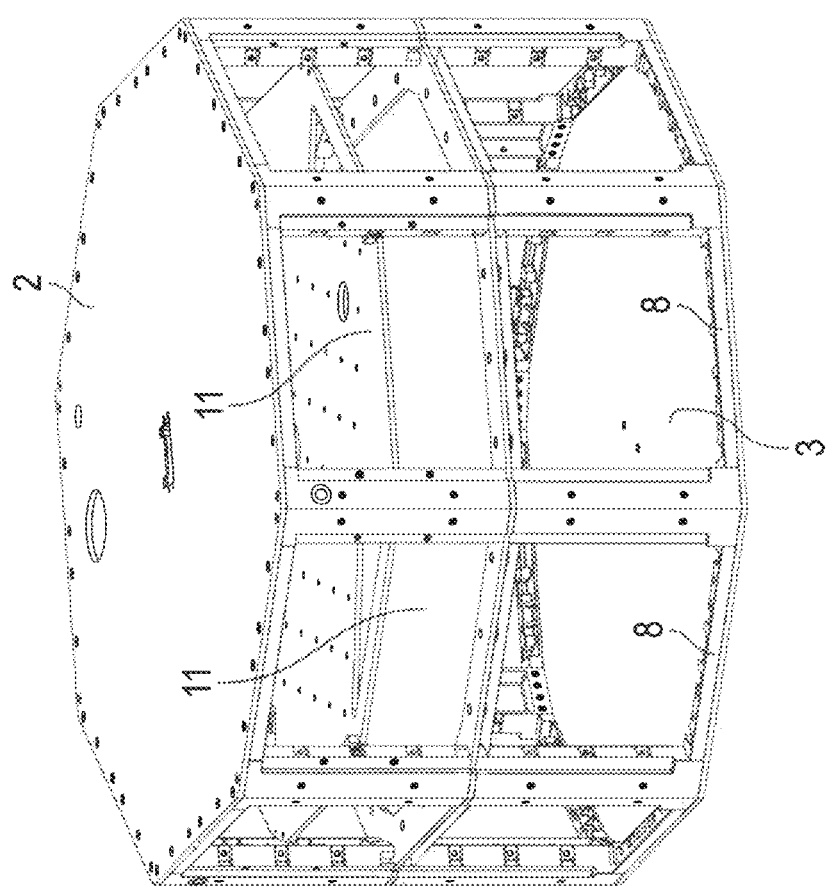
FIG. 20 is a perspective view of the modular satellite testing platform system of FIG. 19 and showing inner areas thereof.

Referring now to FIGS. 6 and 20-21, additional features of the present invention are now described in greater detail. The system 1 may comprise a plurality of shelf members 11. The shelf members 11 may be attached to and carried by the lower support members 5, the upper support members 6, the intermediate members 4, the lower member 3, or the lower bar members 8. The shelf members 11 may be adapted to facilitate attachment, connection, and/or fixation or various components, devices, and/or mechanisms as understood by those skilled in the art.

Figure 13:
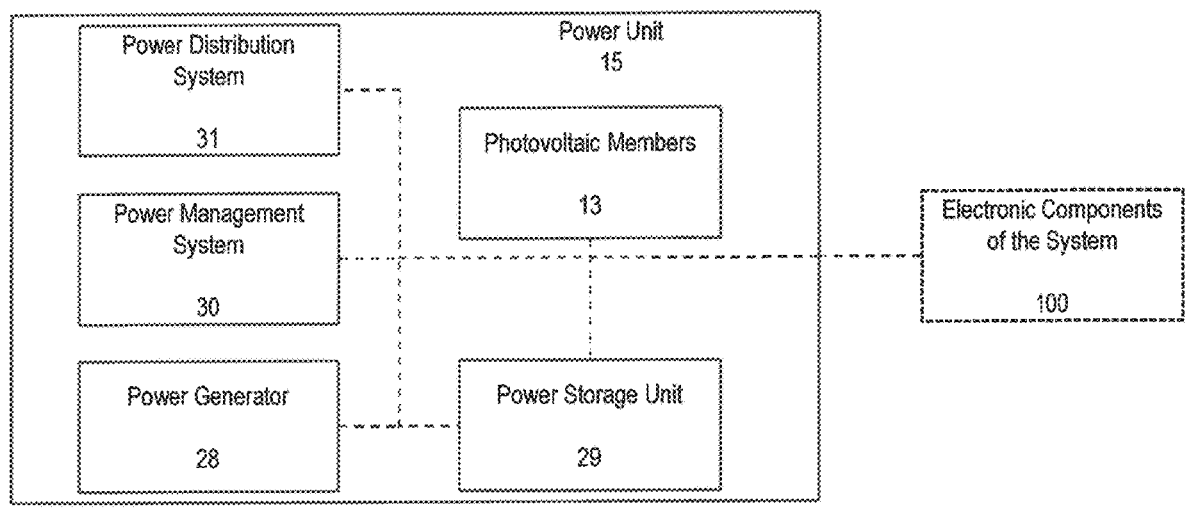
FIG. 13 is a schematic diagram of a power unit of the modular satellite testing platform system according to an embodiment of the present invention.

Referring now to FIGS. 1-3, 6-9, 13, 16-19, and 21, the system 1 may also include a power unit 15 that may include a plurality of photovoltaic members 13. The photovoltaic members 13 may be attached to the bottom cover members 10. The attachment of the photovoltaic members 13 to the bottom cover members 10 may be on an outside face or an inside face of the bottom cover members 10, or on both the inside and outside face of the bottom cover members 10. The photovoltaic members 13 may be placed on one or more of the bottom cover members 10. The photovoltaic members 13 of the power unit 15 may be configured to be in communication with one or more power storage units 29 that are onboard the system 1 illustratively shown in FIGS. 10 and 13. The photovoltaic member 13 may be configured so that they are operable to charge power storage units 29. Further details about the photovoltaic members 13 and the power storage units 29 follow below.

Referring specifically now to FIGS. 3, 17-18, and 21, the system 1 may include a space deployment arm attachment member 14. The space deployment arm attachment member 14 may be attached to an outside face of the lower member 3 and be configured to allow the grasping of the space deployment arm attachment member 14 by a space deployment arm so that the system 1 may be manipulated, handled, and/or launched in space. In some embodiments of the present invention the attachment member 14 may be attached to an outside face of the upper member 2, or there may be a first attachment member 14 attached to an outside face of the lower member 3 and a second attachment member 14 attached to an outside face of the upper member 2.

The attachment member 14 may be configured to be grasped and manipulated by a robotic space arm (not shown)

that may be attached to a device in space (not shown). For example, without limitation, the device in space may be a space station, a satellite, a shuttle (or other vehicle), a rocket, a space pod, or any other device as understood by those skilled in the art that is capable of being placed in space to deploy a satellite and/or an embodiment of the present invention. The robotic space arm may comprise of a space station integrated kinetic launcher for orbital payload system (SSIKLOPS) or other robotic space arm or other device as understood by those skilled in the art that is capable of grasping and/or manipulating the attachment member 14 and/or the system 1. The attachment member 14 may be inserted into the robotic space arm for the robotic space arm to fixedly attach to or matingly engage the attachment member 14. The engagement of the robotic space arm with the attachment member 14 may be controllably releasable by the robotic space arm.

In some embodiments of the present invention the upper member 2, the lower member 3, the intermediate members 4, the lower support members 5, the upper support members 6, the upper cover members 7, the lower bar members 8, the hinge members 9, the bottom cover members 10, the space deployment arm attachment member 14, and the shelf members 11 may be made by a three-dimensional (3D) printing process such as, but not limited to, by continuous fiber fabrication (CFF). More specifically, CFF creates continuous layers of fiber using a 3D printing material to create components and/or objects. The 3D printing material may comprise a composite material that may have an onyx filament (nylon mixed with carbon fiber), carbon fiber, Kevlar, and/or fiberglass. Preferably, the 3D printing material used is the onyx filament for its advantageous properties. For example, components made with the 3D CFF onyx filament are advantageously stronger than type 6061 aluminum and about 40% lighter, while also having advantageous heat resistance, chemical resistance, and a smooth surface finish.

Those skilled in the art will notice and appreciate that using a 3D printed material for the upper member 2, the lower member 3, the intermediate members 4, the lower support members 5, the upper support members 6, the upper cover members 7, the lower bar members 8, the hinge members 9, the bottom cover members 10, the space deployment arm attachment member 14, and the shelf members 11 is also advantageous by allowing for fast turnover times from, when choosing which embodiment of the present invention is desired, and to having the chosen embodiment since 3D printing machines are highly configurable for implementing changes in creating/manufacturing components and/or objects. Furthermore, those skilled in the art will notice and appreciate that it is advantageous to use a 3D printing process to create the upper member 2, the lower member 3, the intermediate members 4, the lower support members 5, the upper support members 6, the upper cover members 7, the lower bar members 8, the hinge members 9, the bottom cover members 10, the space deployment arm attachment member 14, and the shelf members 11 so that one or a few 3D printing machines may be used to manufacture one or more of the components, members, and/or objects as described herein of an embodiment of the present invention rather than having to use multiple manufacturing machines that have less output configurability than a 3D printing machine. This is especially advantageous if multiple or many different embodiments of the present invention vary in demand, need, and/or market forces.

Those skilled in the art will notice and appreciate that the upper member 2, the lower member 3, the intermediate members 4, the lower support members 5, the upper support members 6, the upper cover members 7, the lower bar members 8, the hinge members 9, the bottom cover members 10, the space deployment arm attachment member 14, and the shelf members 11 may be made in whole or in part by continuous fiber fabrication (CFF) three-dimensional (3D) printing with micro-carbon fiber filled nylon composite material filament or made out of any other material as understood by those skilled in the art while still accomplishing all of the goals, features, and advantages of the present invention. For example, without limitation, metals, composites, plastics, ceramics, and silicone materials either in whole or in part.

Referring now to FIG. 5, in some embodiments of the present invention the upper member 2 and the lower member 3 may illustratively be provided to have an octagonal shape. Those skilled in the art will appreciate, however, that the upper member 2 and the lower member 3 may be in a variety of different shapes while still accomplishing all the features, advantages, and goals of the present invention. Although an octagonal shape is shown in the appended figures, the present invention is not meant to be limited to an octagonal shape but may have any other shape as needed and/or required.

Figure 10:
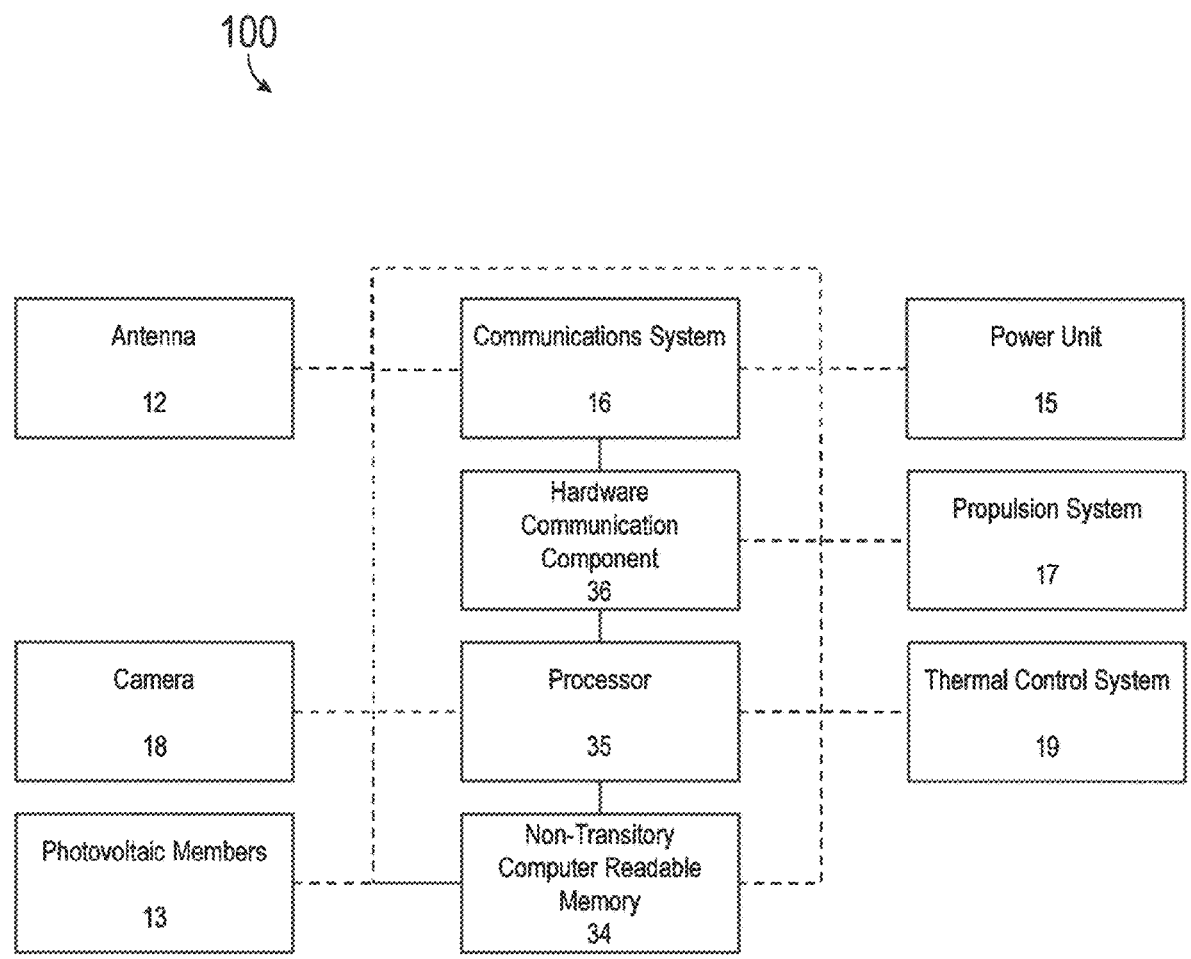
FIG. 10 is a schematic diagram of electronic components of the modular satellite testing platform system according to an embodiment of the present invention.

Referring now to FIG. 10, the system 1 may generally include a power unit 15, a non-transitory computer readable memory 34, a processor 35, a hardware communication component 36, a communications system 16, a propulsion system 17, a thermal control system 19, a camera 18, a photovoltaic member 13, and an antenna 12. Each of these components may be referred to herein separately or may collectively (or any number of components in combination) be referred to as electronic components of the system 100 according to the present invention.

The power unit 15 may be connected to the non-transitory computer readable memory 34, a processor 35, a hardware communication component 36, a communications system 16, a propulsion system 17, a thermal control system 19, a camera 18, a photovoltaic member 13, and an antenna 12 to supply, maintain, and control the electric power of the system 1. The power unit 15, as illustratively shown, for example, in FIG. 13, may include one or more of a power distribution system 31, a power generator 28, a power management system 30, and a power storage unit 29 onboard the system 1. The power distribution system 31 may be positioned in communication with the electronic components of the system 100 to distribute power and may be controlled by the processor 35, the communications system 16, or the power management system 30 to control the power that is distributed to the electronic components of the system 100. The power generator 28 may be used as a main, secondary, temporary, or emergency source of power for the system 1.

The power generator 28 may be in communication with the power management system 30, the power distribution system 31, the power storage unit 29, the processor 35, the communications system 16, and/or the antenna 12. The power generator 28 may be adapted to be controlled by the power management system 30, power distribution system 31, the power storage unit 29, processor 35, communications system 16, and/or the antenna 12 for automatic and/or manual activation, deactivation, and/or regulation. The power management system 30 may be positioned in communication with the electronic components of the system 100, and may be adapted to regulate and/or monitor the electric power used, consumed, and supplied to the electronic components of the system 100.

The power storage units 29 may be in communication with the electronic components of the system 100. The power storage units 29 may be configured to supply electric power to the electronic components of the system 100, and may also be configured to be charged by the electronic components of the system 100 and to retain the charge received from the electronic components of the system 100. Specifically, the power storage units 29 may be charged by the photovoltaic member(s) 13, the power distribution system 31, the power management system 30, and the power generator 28.

The power storage units 29 may comprise of a variety of different devices that store energy that may be used as an electrical power supply and that may be rechargeable, such as, without limitation, lead-acid batteries, nickel-cadmium batteries, nickel-metal hydride batteries, and/or lithium ion batteries. Those skilled in the art will notice and appreciate that a variety of different devices that can store power may be used as the power storage units 29 while still accomplishing all the goals, features, and advantages of the present invention.

Continuing to reference FIG. 10, the non-transitory computer readable memory 34 may be configured to be in communication with the processor 35. The non-transitory computer readable memory 34 may be configured to store computer-readable instructions or code for access and use by the processor 35 and/or the electronic components of the system 100. The non-transitory computer-readable memory 34 can be provided by a plurality of types of computer-readable memories. For example, without limitation, random access memory (RAM), static random-access memory (SRAM), dynamic random access memory (DRAM), read-only memory (ROM), erasable programmable read-only memory (EPROM), electronically erasable programmable read-only memory (EEPROM), and marked read-only memory (MROM). Those skilled in the art will recognize and appreciate that the non-transitory computer readable memory 34 can be provided for by a plurality of different types of computer-readable memories while still accomplishing at the features, goals, and advantages of the present invention.

The processor 35 of the system 1 may be positioned in communication with the hardware communication component 36, the communications system 16, the antenna 12, the propulsion system 17, the thermal control system 19, the camera 18, the photovoltaic member 13, the power unit 15, and/or the non-transitory computer readable memory 34. The processor 35 may be used as the component that processes the commands, instructions, and signals to be received, transmitted, and computed by the electronic components of the system 100. Processors that may be used for example, without limitation, a microprocessor, microcontroller, embedded processor, and/or a digital signal processor. Those skilled in the art will appreciate that a plurality of different processors may be used as the processor 35 for the system 1 while still accomplishing all the goals, features, and advantages of the present invention.

The hardware communication component 36 may be positioned in communication with the communications system 16, the propulsion system 17, the thermal control system 19, the antenna 12, the camera 18, the photovoltaic member 13, the processor 35, the non-transitory computer readable member 34, and the power unit 15. The hardware communication component 36 may be used as the hub for receiving, directing, and managing the flow of computer-readable information and instructions to and/or from the electronic components of the system 100. The connections to and from the hardware communication component 36 may be either through wired or wireless technology. For example, without limitation, the connection may be by land-line, ethernet, fiber-optic, Wi-Fi, or Bluetooth. Those skilled in the art will recognize and appreciate that there are a variety of different ways the hardware communication component 36 may be connected in communication with the electronic components of the system 100 while accomplishing all the features, goals, and advantages of the present invention.

Figure 12:
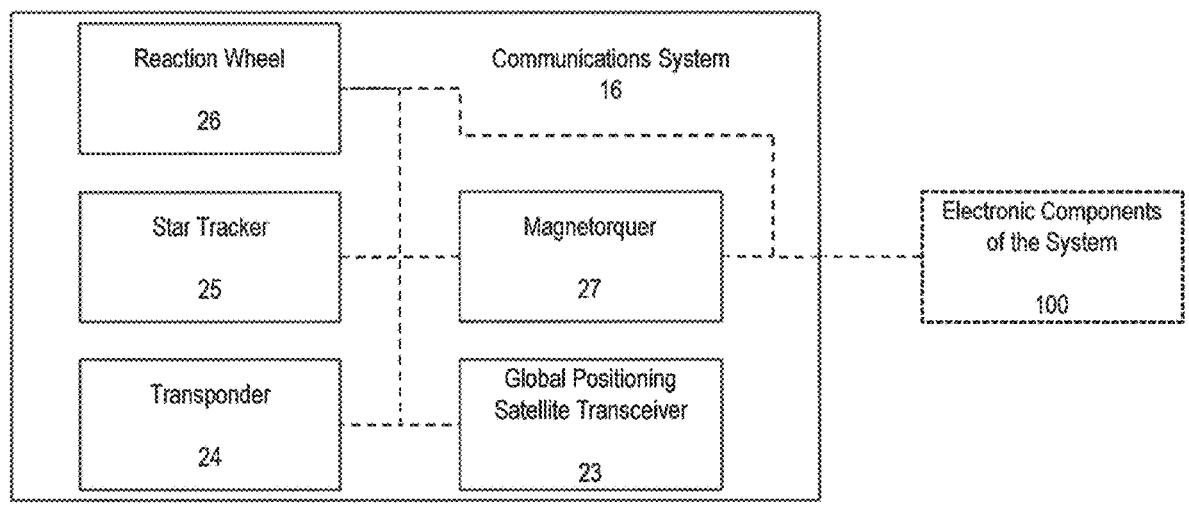
FIG. 12 is a schematic diagram of a communications system of the modular satellite testing platform system according to an embodiment of the present invention.

Referring now specifically to FIGS. 10 and 12, the communications system 16 may be positioned in communication with the hardware communication component 36, the processor 35, the non-transitory computer readable memory 34, the antenna 12, the propulsion system 17, the thermal control system 19, the camera 18, and the photovoltaic member 13. The communications system 16 may include a reaction wheel 26, a star tracker 25, a magnetorquer 27, a global positioning satellite transceiver 23, and a transponder 24. Each of the reaction control wheel 26, the star tracker 25, the magnetorquer 27, the global positioning satellite transceiver 25, and the transponder 24 may be in communication with each other, i.e. all may be in communication with one another, or one or more may be in communication with one or more of each other. The communications system 16 may be used to receive and transmit data and information to and from the system 1 and other communication devices (not shown). The other communication devices may include, without limitation, antennas, space stations, communication towers, and other satellites or other devices capable of communication as understood by those skilled in the art.

The reaction wheel 26 may be positioned in communication with the electronic components of the system 100. The reaction wheel 26 may be configured to control the orientation of the system 1 while the system 1 is deployed in space either by automatic operation of the electronic components of the system 100 or by manual operation of a user communicating with the system 1 through the electronic components. The star tracker 25 may be positioned in communication with the electronic components of the system 100 and configured to measure the positions of stars and export this data and receive data through the antenna 12, the transponder 24, and/or the global positioning satellite transceiver 23.

The magnetorquer 27 may be positioned in communication with the electronic components of the system 100 and may be configured to control the attitude, tumbling, and/or stabilization of the system 1 unilaterally or by inputs from the electronic components of the system 100 or by manual user inputs a user inputs into the system 1 through the electronic components. The global positioning satellite (GPS) transceiver 23 may be positioned in communication with the electronic components of the system 100 and may be configured to calculate, receive, and/or export data of the system's 1 geographical location either directly to or from a device (not shown) or through the electronic components of the system 100. The transponder 24 may be positioned in communication with the processor 35, the hardware communication component 36, the antenna 12, and/or the communications system 16. The transponder 24 may be used to receive a signal and emit a same or different signal in response at a lower, same, or greater power level than the signal received by the transponder 24.

The signals received and transmitted by the transponder 24 may be of a variety of different types of signals, for example, without limitation, radio wave, microwave, infrared, or visible light signals. Those skilled in the art will recognize and appreciate that the transponder 24 may be configured to receive and/or transmit a variety of different signal types while still accomplishing all the goals, features, and advantages of the present invention.

Figure 14:
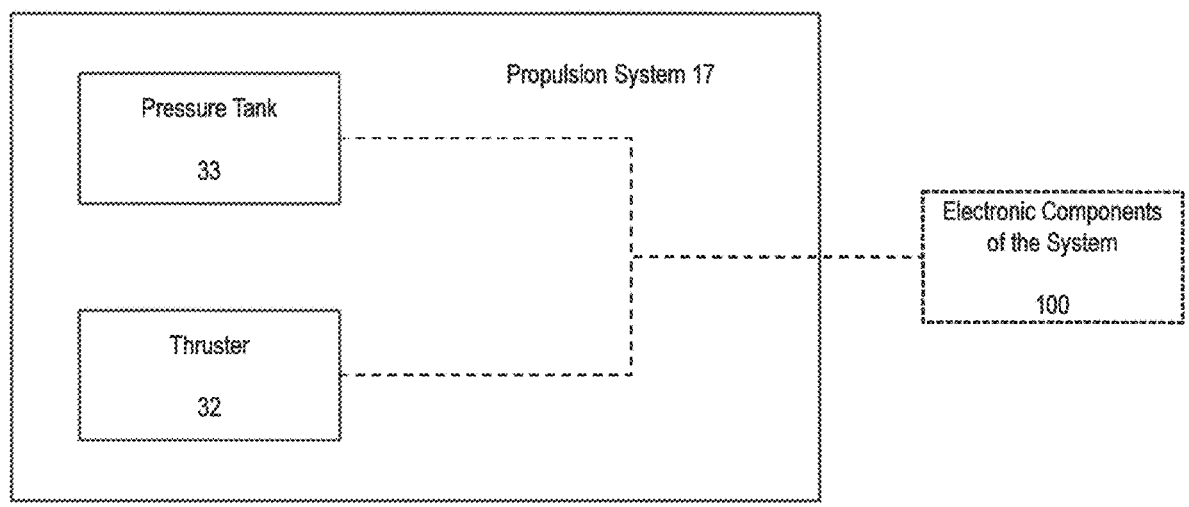
FIG. 14 is a schematic diagram of a propulsion system of the modular satellite testing platform system according to an embodiment of the present invention.

Now referring back to FIG. 10 and additionally to FIG. 14, the propulsion system 17 may be positioned in communication with the processor 35, the satellite antenna 12, the hardware communication component 36, the camera 18, and/or the communications system 16. The propulsion system 17 may be used to apply physical force to the system 1. The propulsion system 1 may include one or more thrusters 32 and/or one or more pressure tanks 33. The thrusters 32 may be fluidically connected to the pressure tanks 33 and the pressure tanks 33 may be configured to house a medium or propellant that may be spent by the thrusters 32 to create a thrust of force on the system 1. The thrusters 32 may be affixed to a variety of locations on an outside surface of the system 1. The thrusters 32 may be configured to directionally rotate or pivot about an axis to change the direction that the thrusters 32 to change the directional orientation of the thrusters 32 or the thrusters 32 may be fixed and stationary so that the thrusters 32 may not rotate or pivot about an axis. The thrusters 32 may be configured to be controlled automatically by the processor 35, the hardware communication component 36, the communications system 16, and/or the antenna 12. The thrusters 32 may also be controlled by manual operation of a user by entering inputs through the system 1 via the communications system 16, the antenna 12, the hardware communication component 36, and/or the processor 35.

Figure 11:
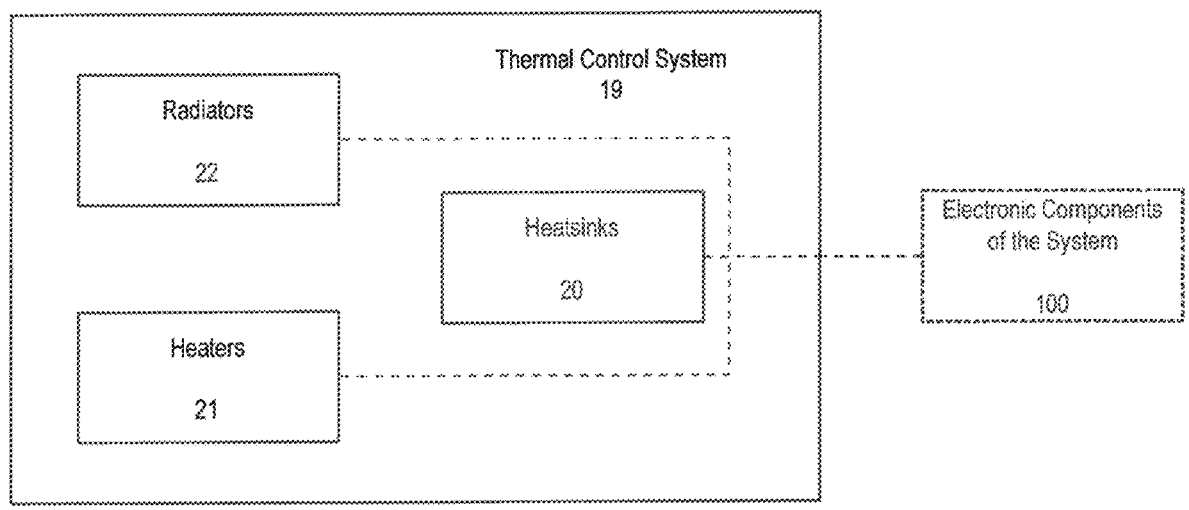
FIG. 11 is a schematic diagram of a thermal control system of the modular satellite testing platform system according to an embodiment of the present invention.

Continuing to reference to FIG. 10 and additionally to FIG. 11, the thermal control system 19 may be positioned in communication with the processor 35, the hardware communication component 36, the satellite 12, and/or the communications system 16. The thermal control system 19 may include one or more radiators 22, heatsinks 20, and/or heaters 21. The radiators 22 may be configured to transfer thermal energy to and/or from the system 1 through a variety of methods including, but not limited to, using a circulating flow of a medium to transfer, transport, and radiate thermal energy as infrared radiation or other form of energy. Those skilled in the art will appreciate that there are a number of different ways in which the radiators 22 may transfer thermal energy to and/or from the system 1 while still accomplishing all the goals, features, and advantages of the present invention. The heatsinks 20 may be configured to absorb and/or dissipate thermal energy from the system 1. The heaters 21 may be configured in communication with the power unit 15 and/or the photovoltaic members 13 to transform electrical energy to thermal energy. The thermal control system 19 may be attached to the upper member 2, the lower member 3, the intermediate members 4, the lower support members 5, the upper support members 6, the upper cover members 7, the lower bar members 8, the hinge members 9, the bottom cover members 10, and/or the shelf members 11. The thermal control system 19 may also be attached to a payload (not shown) housed or installed in the system 1. Those skilled in the art will notice and appreciate that the thermal control system 19 may be placed in a variety of locations throughout the system 1 to control the thermals of the system 1 and of the payload housed or installed into the system 1.

Referring specifically now to FIG. 10, the photovoltaic members 13 may be positioned in communication with the power unit 15, the processor 35, the camera 18, the antenna 12, the communications system 16, the hardware communication component 36, the non-transitory computer readable memory 34, the propulsion system 17, and/or the thermal control system 19. The photovoltaic members 13 may be configured to convert light energy into electrical energy to provide power to the system 1. The photovoltaic members 13 may be used as the main, secondary, or emergency source of power for the system 1. The photovoltaic members 13 may be configured so that they may be automatically or manually activated and/or deactivated for example, without limitation, when the power unit 15 detects that the power storage units 29 are at full capacity it may send a signal to the photovoltaic members 13 to deactivate, or when the power unit 15 detects that the power storage units 29 are less than fully charged the power unit 15 may send a signal to the photovoltaic members 13 to activate. The photovoltaic members 13 may be, without limitation, monocrystalline silicon, polycrystalline silicon, passivated emitter and rear contact, or thin film photovoltaic devices. Those skilled in that art with identify and appreciate that a variety of types of photovoltaic devices and be used as the photovoltaic members 13 while still accomplishing all the features, advantages, and goals of the present invention.

Referring back to FIGS. 1 and 6, the system 1 may include a payload (not shown) that is housed by the system. The payload may include a variety of different objects, devices, and/or computer-readable information or code defined as modular payloads (not shown). The modular payloads may be attached to the shelf members 11, the lower support members 5, the upper support members 6, the intermediate support members 4, the upper member 2, the lower member 3, the bottom cover members 10, the lower bar members 8, or the upper cover members 7.

Now referring back to FIG. 10, if the modular payload is not a physical object but is instead computer-readable information or code, then the modular payload may be stored on the processor 35, the hardware communication component 36, the communications system 16, the non-transitory computer readable memory 34, the antenna 12, the camera 18, the photovoltaic member 13, and/or the power unit 15.

Continuing to reference FIG. 10, the electronic components of the system 100 may include a communication network (not shown) that may be in communication with the electronic components of the system 100, including, but not limited to, the communications system 16, the antenna 12, the hardware communication component 36, and the processor 35. The communication network may also be in communication with other devices (not shown) that are not onboard the system 1, such as, without limitation, a personal computer, a tablet computer, a cellular device, a computer terminal, and/or any other device as understood by those skilled in the art that is capable of communication with the communication network. The communication network may comprise of, without limitation, a satellite, an antenna, a communication tower, and/or a radio receiver or transceiver.

Continuing to reference FIG. 10, the system 1 may include a camera 18 that may be positioned in communication with the power unit 15, the photovoltaic members 13, the processor 35, the hardware communication component 36, the communications system 16, the antenna 12, and/or the non-transitory computer readable memory 34. The camera 18 may be configured to take images or videos that may be stored in the non-transitory computer readable memory 34 as computer readable instructions or code. The camera may also be configured to send the images or videos to a device (not shown) through the communication network (not shown) via the antenna 12, the communications system 16, the hardware communication component 36, and/or the processor 35. The camera 18 may be configured to take images and/or videos of different spectrums of light such as, without limitation, x-ray, infrared, visible light, gamma rays, radar, and/or ultraviolet.

The system 1 and/or the attachment member 14 may be configured to have the robotic space arm release, launch, or push the system 1 or attachment member 14 so that the system 1 may be placed into space and/or the orbit of earth. The system 1 may be released, launched, or pushed by the robotic space arm releasing the attachment member 14, by the robotic space arm releasing the attachment member 14 and applying force against the attachment member 14 or the system 1, and/or by the robotic space arm releasing the attachment member 14 and force is applied on the system 1 by the propulsion system 17. The force applied against the attachment member 14 or system 1 by the robotic space arm may be through the use of spring assisted hinged petals.

The system 1 and the electronic components of the system 100 may be controlled and communicated with by other devices (not shown). The other devices may be located on earth, in space, or anywhere in between earth and space. For example, without limitation, the system 1 may be controlled by a ground base station, a satellite, a space station, and/or any device as understood by those skilled in the art that may be used to communicated and control the system 1. The other devices may communicate with the electronic components via the communication network (not shown), or through direct communication to and from the electronic components. The other devices, electronic components, and the communication network may and in communication with one another through various ways including, but not limited to, landline, DSL, Wi-Fi, Bluetooth, radio, microwave, fiber optic, ethernet, cable, or other way of connection and communication as understood by those skilled in the art.

The system 1 may be configured to be carried into space as cargo onboard the payload of a separate vehicle. The system 1 may be configured to be carried into space by a rocket, shuttle, air-launch-to-orbit vehicle, spaceplane, and/or any other launching device as understood by those skilled in the art that is capable of carrying a payload to space, the orbit of earth, and/or to an atmosphere of earth.

The system 1 may comprise a multilayer insulation 20 used throughout the apparatus to increase regulation and control over temperatures of the satellite testing platform system, as illustrated in FIGS. 2-4, and 15. The insulation may be a multilayer or single layer insulation and may be of a type of insulation as understood by those skilled in the art that may be used in the vacuum of space.

The system 1 may also comprise of a thermal coating (not shown) painted onto various locations of the system 1 to further increase regulation and control over the temperatures of the satellite testing platform system. The thermal coating may be used to affect reflection and absorption of various spectrums of light, for example, without limitation, visible light, radio-waves, gamma radiation, and ultraviolet light.

Figure 15:
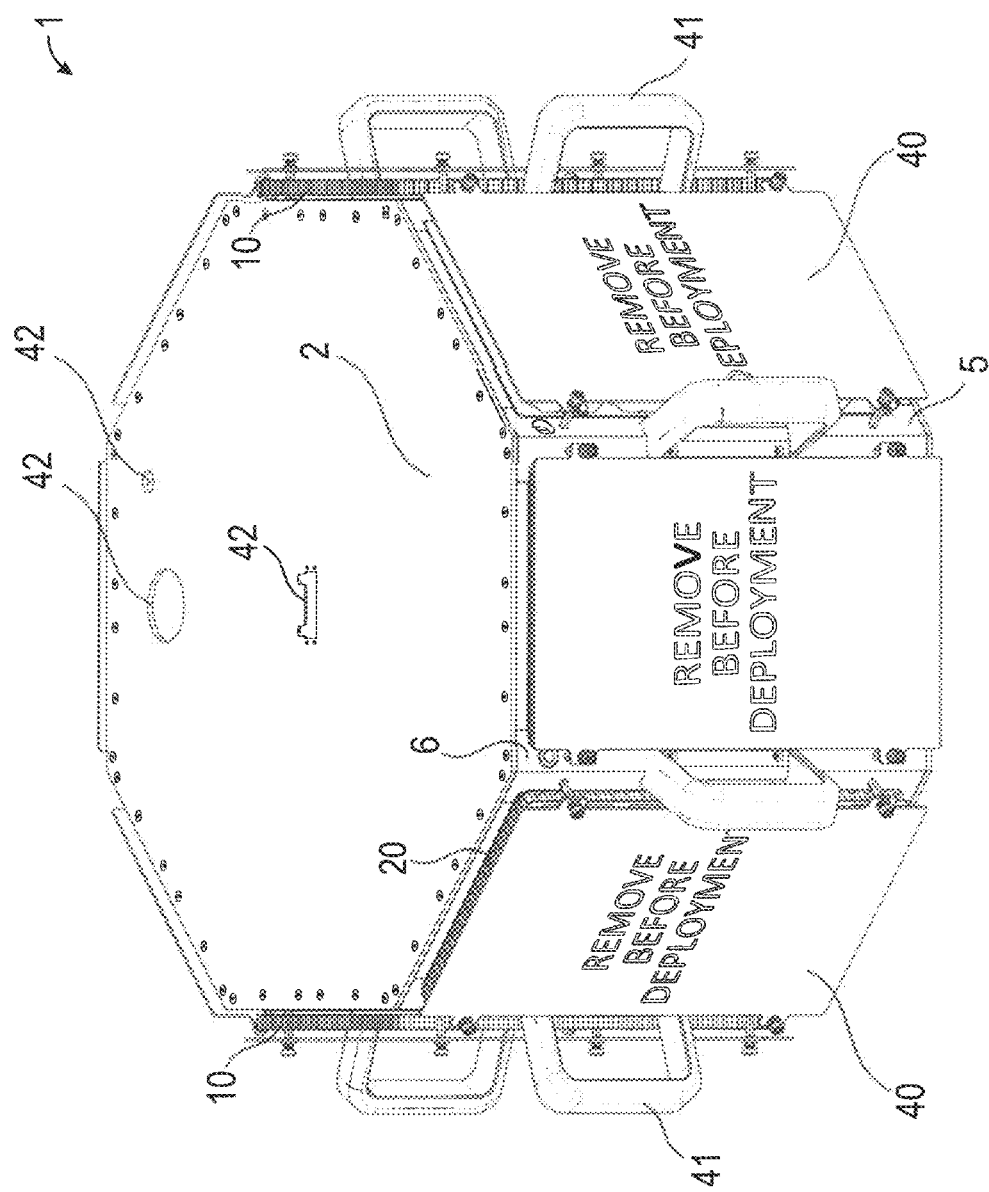
FIG. 15 is a perspective view of a modular satellite testing platform system including cover members and U-shape members according to an embodiment of the present invention.

Referring now to FIG. 15, an embodiment of the present invention may include one or more U-shape members 41, cover protection members 40, and/or one or more through channels 42. The cover protection members 40 may be positioned to overlay the bottom cover members 10 and may cover the photovoltaic members 13 that are located on the bottom cover member 10. The cover protection members 40 may be used to provide protection for the bottom cover members 10 and the photovoltaic members 13. The cover protection members 40 may be attached to the upper support members 6, lower support members 5, upper member 2, and/or the lower member 3. The U-shape members 41 may be adapted to be removed from the upper support members 6, lower support members 5, the upper member 2, and/or the lower member 3 after having been attached thereto.

Figure 16:
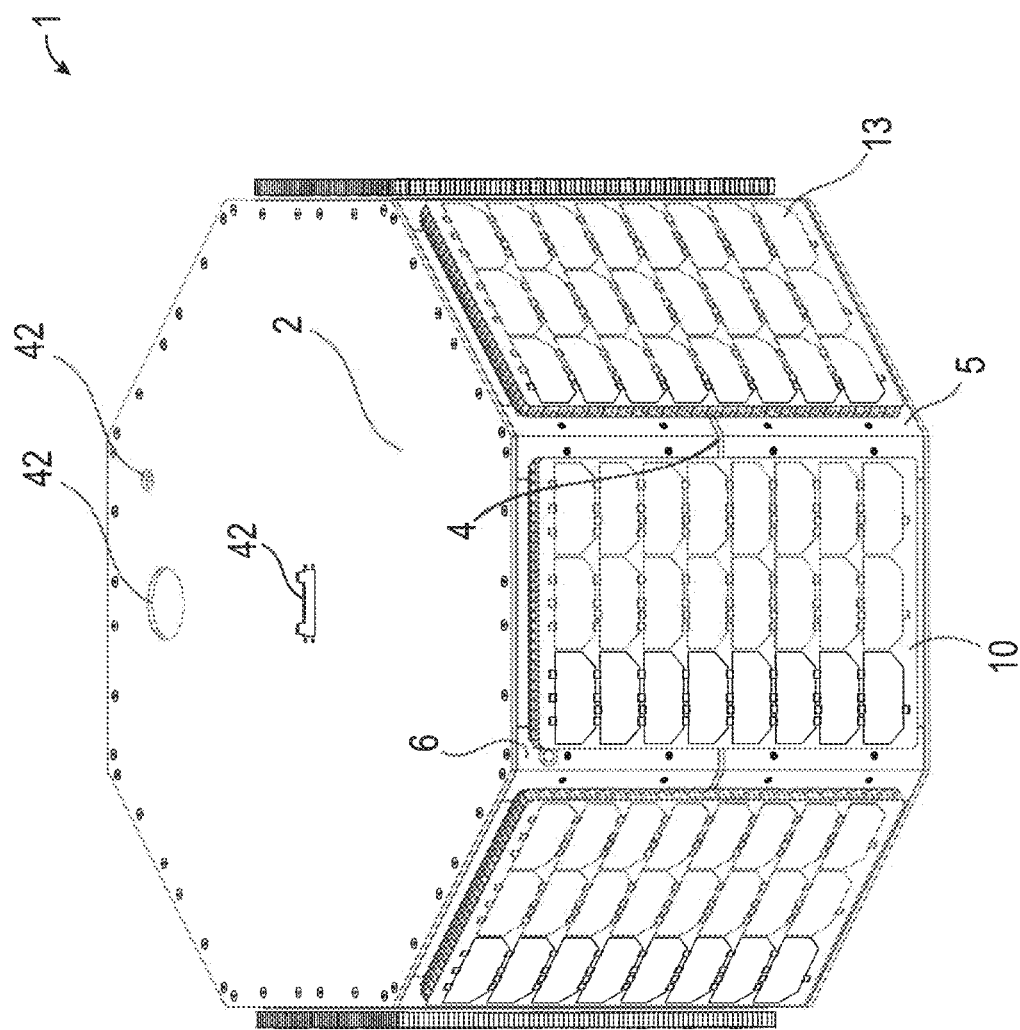
FIG. 16 is another perspective view of the modular satellite testing platform system of FIG. 15 with the cover members and U-shape members removed.
Figure 19:
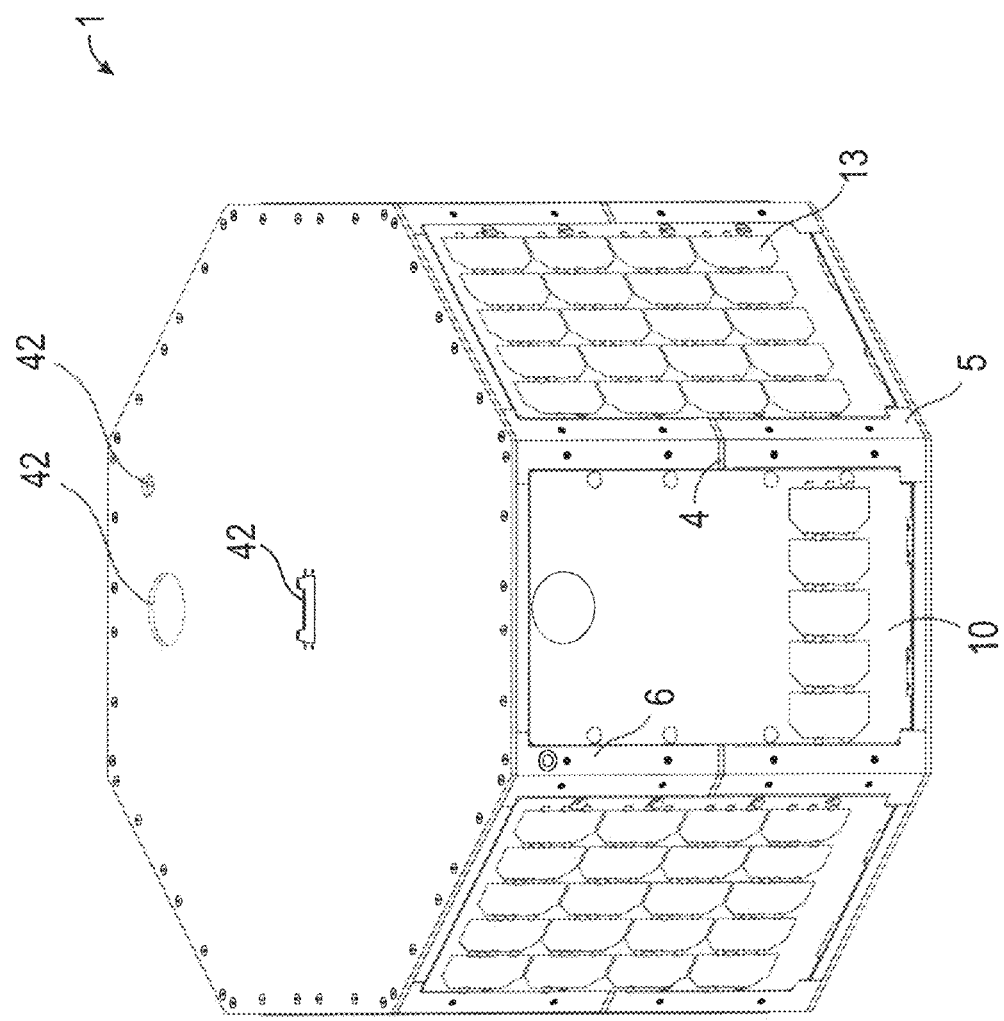
FIG. 19 is a perspective view of a modular satellite testing platform system showing photovoltaic members only covering a portion of a bottom cover member according to an embodiment of the present invention.

Now additionally referring to FIGS. 16 and 19-20, the through channels 42 may be positioned on a face of the upper member 2 and/or the lower member 3. The through channels 42 may be used to allow connections to travel through the upper member 2 and/or the lower member 3. The through channels 42 may also be adapted to facilitate the attachment of a variety of components or members. For example, without limitation, the satellite antenna 12.

Now referring to FIGS. 17 and 21, in some embodiments of the present invention the photovoltaic members 13 may be attached to an outer facing surface of the upper member 2 and/or the lower member 3. Also, in some embodiments of the present invention the attachment member 14 may be attached to an outer facing surface of the upper member 2 instead of on the lower member 3. Those skilled in the art will notice and appreciate that there may also be an attachment member 14 located on both the upper member 2 and the lower member 3.

Now referring specifically to FIG. 17, the shield members 43 may be configured to extend between to the upper member 2, the lower member 3, and lower support members 5, and the upper support members 6. The shield members 43 may be attached or removably attached to the upper member 2, the lower member 3, and lower support members 5, and the upper support members 6.

Now referring to FIG. 19, in some embodiments of the present invention the photovoltaic members 13 may be positioned to cover only a portion of the outside or inside surface of the bottom cover members 10. Those skilled in the art will notice an appreciate that the photovoltaic member 13 may cover all or a portion of the bottom cover members 10, and/or vary in how the photovoltaic members 13 cover each bottom cover member 10 while still accomplishing all the goals, features, and advantages of the present invention.

The U-shape members 41 may be attached to one or more of the upper support members 6, lower support members 5, and/or the cover protection members 40. The U-shape members 41 may be advantageously used, without limitation, as handles, spacers, bumpers, and/or points of attachment. The U-shape members 41 may be adapted to be removed from the upper support members 6, lower support members 5, and/or the cover protection members 40 after having been attached thereto.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A modular satellite testing platform system comprising:
an upper member;
a lower member;
a plurality of intermediate members positioned between the upper member and the lower member;
a plurality of lower support members connected to and extending between the lower member and one of the plurality of intermediate members;
a plurality of upper support members connected to and extending between one of the plurality of intermediate members and the upper member;
a plurality of lower bar members connected to and extending between a lower portion of an adjacent pair of the plurality of lower support members and affixed to at least one of the lower member and the plurality of lower support members;
a plurality of hinge members affixed at one end to at least one of the lower member and the plurality of lower bar members;
a plurality of bottom cover members affixed at a lower end thereof to the plurality of hinge members at another end of the plurality of hinge members, wherein each of the plurality of bottom cover members has an interior surface and an exterior surface, and wherein each of the plurality of bottom cover members extends between a pair of the plurality of lower support members and between one of the plurality of lower bar members and one of the plurality of intermediate members;
at least one shelf member carried by and extending between each of the plurality of lower support members and aligned with the upper member and the lower member by having parallel planes therewith;
a thermal control system;
a plurality of cover protection members removably attached to at least one of the plurality of lower support members and at least one of the plurality of upper support members to overlay the exterior surface of each of the plurality of bottom cover members while the plurality of bottom cover members are in a closed position;
a plurality of U-shape members positioned between the upper member and the lower member, each of the plurality of U-shape members being removably attached to one of the plurality of upper support members and one of the plurality of lower support members;
wherein the plurality of hinge members are configured to rotate about a rotational axis thereof, causing the plurality of bottom cover members to be selectively rotatably translated between an opened position and the closed position;
wherein the at least one shelf member has an upper surface and a lower surface;
wherein the opened position is defined as when the plurality of bottom cover members are selectively rotatably translated so that the upper and lower surfaces of the at least one shelf member are significantly exposed to an outside environment and so that the interior surface of each of the plurality of bottom cover members are significantly exposed to the outside environment;
wherein the closed position is defined as when the plurality of bottom cover members are selectively rotatably translated so that the upper and lower surfaces of the at least one shelf member are unexposed to the outside environment and so that the interior surface of each of the plurality of bottom cover members are unexposed to the outside environment;
wherein the plurality of bottom cover members are prevented from moving between the closed position and the opened position while the cover protection members are removably attached to at least one of the plurality of lower support members and at least one of the plurality of upper support members and are overlaying the exterior surface of the bottom cover members;
wherein each one of the plurality of U-shape members are positioned between a pair of the plurality of cover protection members while the plurality of cover protection members are removably attached to at least one of the plurality of lower support members and at least one of the plurality of upper support members and are overlaying the exterior surfaces of the plurality of bottom cover members; and
wherein the plurality of lower bar members and the plurality of intermediate members are significantly exposed to the outside environment when the plurality of bottom cover members are in the opened position and when in the closed position.

2. The modular satellite testing platform system of claim 1, wherein at least one of the upper member, the lower member, the plurality of intermediate members, the plurality of lower support members, the plurality of upper support members, the plurality of lower bar members, the plurality of hinge members, the plurality of bottom cover members, and the at least one shelf member are made by continuous fiber fabrication (CFF) three-dimensional (3D) printing with micro-carbon fiber filled nylon composite material filament.

3. The modular satellite testing platform system of claim 1, wherein the upper member and the lower member are octagonal in shape.

4. The modular satellite testing platform system of claim 1, further comprising:
a power unit comprising at least one of:
at least one power generator;
at least one power storage unit;
a power management system; and
a power distribution system; and
a propulsion system comprising at least one of:
a thruster; and
at least one pressure tank.

5. The modular satellite testing platform system of claim 1, further comprising at least one photovoltaic member affixed to an interior surface of a respective at least one of the plurality of bottom cover members; wherein the at least one photovoltaic member is configured to be in communication with at least one power storage unit onboard the modular satellite testing platform; and wherein the at least one photovoltaic member is operable to charge the at least one power storage unit.

6. The modular satellite testing platform system of claim 1, further comprising at least one photovoltaic member affixed to an exterior surface of a respective at least one of the plurality of bottom cover members; wherein the at least one photovoltaic member is configured to be in communication with at least one power storage unit onboard the modular satellite testing platform; and wherein the at least one photovoltaic member is operable to charge the at least one power storage unit.

7. The modular satellite testing platform system of claim 1, further comprising a communications system in communication with an antenna, and wherein the communications system comprises:
   a wireless communication control system; and
   a transceiver positioned in communication with the wireless communication control system.

8. The modular satellite testing platform system of claim 1, further comprising a navigation system in communication with an antenna, and wherein the navigation system comprises at least one of:
   a global positioning satellite transceiver;
   a transponder;
   a star tracker;
   a reaction wheel; and
   a magnetorquer.

9. The modular satellite testing platform system of claim 1, further comprising at least one camera; wherein the at least one camera comprises at least one of an infrared camera and a visible light camera; and wherein the at least one camera is in communication with on board data storage to store at least one of images and video collected by the at least one camera.

10. The modular satellite testing platform system of claim 1, further comprising:
    a multilayer insulation used throughout the apparatus to increase regulation and control over temperatures of the satellite testing platform system; and
    a thermal coating painted onto the modular satellite testing platform to further increase regulation and control over the temperatures of the satellite testing platform system.

11. The modular satellite testing platform system of claim 1, wherein the lower member is configured to be handled by a space deployment arm.

12. The modular satellite testing platform system of claim 1, wherein the thermal control system further comprises at least one of:
    a plurality of heatsinks;
    a plurality of heaters; and
    a plurality of radiators.

13. The modular satellite testing platform system of claim 1, wherein the at least one shelf member comprises a plurality of shelf members carried by and extending between at least one of the plurality of lower support members, the plurality of intermediate members, and the plurality of upper support members; wherein each shelf member of the plurality of shelf members has an upper surface and a lower surface; and wherein each upper and lower surface of each shelf member of the plurality of shelf members is significantly exposed to the outside environment when the plurality of bottom cover members are in the opened position.

14. A modular satellite testing platform system comprising:
    an upper member;
    a lower member;
    a plurality of intermediate members positioned between the upper member and the lower member;
    a plurality of lower support members connected to and extending between the lower member and one of the plurality of intermediate members;
    a plurality of upper support members connected to and extending between one of the plurality of intermediate members and the upper member;
    a plurality of lower bar members connected to and extending between a lower portion of an adjacent pair of the plurality of lower support members and affixed to at least one of the lower member and the plurality of lower support members;
    a plurality of hinge members affixed at one end to at least one of the lower member and the plurality of lower bar members;
    a plurality of bottom cover members affixed at a lower end thereof to the plurality of hinge members at another end of the plurality of hinge members, wherein each of the plurality of bottom cover members has an interior surface and an exterior surface, and wherein each of the plurality of bottom cover members extends between a pair of the plurality of lower support members and between one of the plurality of lower bar members and one of the plurality of intermediate members;
    at least one shelf member carried by and extending between each of the plurality of lower support members and aligned with the upper member and the lower member by having parallel planes therewith;
    a thermal control system;
    an antenna affixed to the upper member;
    a plurality of photovoltaic members affixed to each of an interior surface and an exterior surface of each of the respective plurality of bottom cover members;
    at least one power storage unit;
    a propulsion system comprising at least one of a thruster and at least one pressure tank;
    a plurality of cover protection members removably attached to at least one of the plurality of lower support members and at least one of the plurality of upper support members to overlay the exterior surface of each of the plurality of bottom cover members while the plurality of bottom cover members are in a closed position; and
    a plurality of U-shape members positioned between the upper member and the lower member, each of the plurality of U-shape members being removably attached to one of the plurality of upper support members and one of the plurality of lower support members;
    wherein the plurality of hinge members are configured to rotate about a rotational axis thereof, causing the plurality of bottom cover members to be selectively rotatably translated between an opened position and the closed position;
    wherein the at least one shelf member has an upper surface and a lower surface;
    wherein at least one of the upper member, the lower member, the plurality of intermediate members, the plurality of lower support members, the plurality of upper support members, the plurality of lower bar members, the plurality of hinge members, the plurality of bottom cover members, and the at least one shelf member are made by continuous fiber fabrication (CFF) three-dimensional (3D) printing with micro-carbon fiber filled nylon composite material filament;
    wherein the plurality of photovoltaic members are configured to be in communication with the at least one power storage unit to charge the at least one power storage unit;

wherein the opened position is defined as when the plurality of bottom cover members are selectively rotatably translated so that the upper and lower surfaces of the at least one shelf member are significantly exposed to an outside environment and so that the interior surface of each of the plurality of bottom cover members are significantly exposed to the outside environment;

wherein the closed position is defined as when the plurality of bottom cover members are selectively rotatably translated so that the upper and lower surfaces of the at least one shelf member are unexposed to the outside environment and so that the interior surface of each of the plurality of bottom cover members are unexposed to the outside environment;

wherein the plurality of bottom cover members are prevented from moving between the closed position and the opened position while the cover protection members are removably attached to at least one of the plurality of lower support members and at least one of the plurality of upper support members and are overlaying the exterior surfaces of the plurality of bottom cover members;

wherein each one of the plurality of U-shape members are positioned between a pair of the plurality of cover protection members while the plurality of cover protection members are removably attached to at least one of the plurality of lower support members and at least one of the plurality of upper support members and are overlaying the exterior surfaces of the plurality of bottom cover members; and wherein the plurality of lower bar members and the plurality of intermediate members are significantly exposed to the outside environment when the plurality of bottom cover members are in the opened position and when in the closed position.

15. The modular satellite testing platform system of claim 14, further comprising a power unit;
wherein the power unit comprises at least one of:
at least one power generator;
a power management system; and
a power distribution system; and
wherein the thermal control system further comprises at least one of:
a plurality of heatsinks;
a plurality of heaters; and
a plurality of radiators.

16. The modular satellite testing platform system of claim 14, further comprising a communications system in communication with the antenna, and wherein the communications system comprises:
a wireless communication control system; and
a transceiver positioned in communication with the wireless communication control system.

17. The modular satellite testing platform system of claim 14, further comprising a navigation system in communication with the antenna, and wherein the navigation system comprises at least one of:
a global positioning satellite transceiver;
a transponder;
a star tracker;
a reaction wheel; and
a magnetorquer.

18. The modular satellite testing platform system of claim 14, further comprising at least one camera; wherein the at least one camera comprises at least one of an infrared camera and a visible light camera; and wherein the at least one camera is in communication with on board data storage to store at least one of images and video collected by the at least one camera.

19. The modular satellite testing platform system of claim 14, wherein the at least one shelf member comprises a plurality of shelf members carried by and extending between at least one of the plurality of lower support members, the plurality of intermediate members, and the plurality of upper support members; wherein each shelf member of the plurality of shelf members has an upper surface and a lower surface; and wherein each upper and lower surface of each shelf member of the plurality of shelf members is significantly exposed to the outside environment when the plurality of bottom cover members are in the opened position.

20. A modular satellite testing platform system comprising:
an upper member;
a lower member;
a plurality of intermediate members positioned between the upper member and the lower member;
a plurality of lower support members connected to and extending between the lower member and one of the plurality of intermediate members;
a plurality of upper support members connected to and extending between one of the plurality of intermediate members and the upper member;
a plurality of lower bar members connected to and extending between a lower portion of an adjacent pair of the plurality of lower support members and affixed to at least one of the lower member and the plurality of lower support members;
a plurality of hinge members affixed at one end to at least one of the lower member and the plurality of lower bar members;
a plurality of bottom cover members affixed at a lower end thereof to the plurality of hinge members at another end of the plurality of hinge members, wherein each of the plurality of bottom cover members has an interior surface and an exterior surface, and wherein each of the plurality of bottom cover members extends between a pair of the plurality of lower support members and between one of the plurality of lower bar members and one of the plurality of intermediate members;
at least one shelf member carried by and extending between each of the plurality of lower support members and aligned with the upper member and the lower member along a plane shared by having parallel planes therewith;
a thermal control system comprising a plurality of heatsinks and a plurality of heaters and a plurality of radiators;
a photovoltaic member affixed to at least one of an interior surface and an exterior surface of at least one of the plurality of bottom cover members;
at least one power storage unit;
an antenna affixed to the upper member;
a communications system in communication with the antenna, the communications system comprising a wireless communication control system and a transceiver positioned in communication with the wireless communication control system;
a multilayer insulation used throughout the modular satellite testing platform to increase regulation and control over temperatures of the satellite testing platform system;

a thermal coating painted onto the modular satellite testing platform to further increase regulation and control over the temperatures of the satellite testing platform system;

a plurality of cover protection members removably attached to at least one of the plurality of lower support members and at least one of the plurality of upper support members to overlay the exterior surface of each of the plurality of bottom cover members while the plurality of bottom cover members are in a closed position; and a plurality of U-shape members positioned between the upper member and the lower member, each of the plurality of U-shape members being removably attached to one of the plurality of upper support members and one of the plurality of lower support members;

wherein the plurality of hinge members are configured to rotate about a rotational axis thereof, causing the plurality of bottom cover members to be selectively rotatably translated between an opened position and the closed position;

wherein the at least one shelf member has an upper surface and a lower surface;

wherein the lower member is configured to be handled by a space deployment arm;

wherein the plurality of photovoltaic members are configured to be in communication with the at least one power storage unit to charge the at least one power storage unit;

wherein the opened position is defined as when the plurality of bottom cover members are selectively rotatably translated so that the upper and lower surfaces of the at least one shelf member are significantly exposed to an outside environment and so that the interior surface of each of the plurality of bottom cover members are significantly exposed to the outside environment;

wherein the closed position is defined as when the plurality of bottom cover members are selectively rotatably translated so that the upper and lower surfaces of the at least one shelf member are unexposed to the outside environment and so that the interior surface of each of the plurality of bottom cover members are unexposed to the outside environment;

wherein the plurality of bottom cover members are prevented from moving between the closed position and the opened position while the cover protection members are removably attached to at least one of the plurality of lower support members and at least one of the plurality of upper support members and are overlaying the exterior surfaces of the plurality of bottom cover members;

wherein each one of the plurality of U-shape members are positioned between a pair of the plurality of cover protection members while the plurality of cover protection members are removably attached to at least one of the plurality of lower support members and at least one of the plurality of upper support members and are overlaying the exterior surfaces of the plurality of bottom cover members; and wherein the plurality of lower bar members and the plurality of intermediate members are significantly exposed to the outside environment when the plurality of bottom cover members are in the opened position and when in the closed position.

21. The modular satellite testing platform of claim 20, wherein at least one of the upper member, the lower member, the plurality of intermediate members, the plurality of lower support members, the plurality of upper support members, the plurality of lower bar members, the plurality of hinge members, the plurality of bottom cover members, and the at least one shelf member is made by continuous fiber fabrication (CFF) three-dimensional (3D) printing with micro-carbon fiber filled nylon composite material filament.

22. The modular satellite testing platform system of claim 20, further comprising:
a power unit comprising at least one of:
at least one power generator;
a power management system; and
a power distribution system; and
a propulsion system comprising at least one of:
a thruster; and
at least one pressure tank.

23. The modular satellite testing platform system of claim 20, further comprising a navigation system in communication with the antenna, and wherein the navigation system comprises at least one of:
a global positioning satellite transceiver;
a transponder;
a star tracker;
a reaction wheel; and
a magnetorquer.

24. The modular satellite testing platform system of claim 20, further comprising at least one camera; wherein the at least one camera comprises at least one of an infrared camera and a visible light camera; and wherein the at least one camera is in communication with on board data storage to store at least one of images and video collected by the at least one camera.

25. The modular satellite testing platform system of claim, 20 wherein the at least one shelf member comprises a plurality of shelf members carried by and extending between at least one of the plurality of lower support members, the plurality of intermediate members, and the plurality of upper support members; wherein each shelf member of the plurality of shelf members has an upper surface and a lower surface; and wherein each upper and lower surface of each shelf member of the plurality of shelf members is significantly exposed to the outside environment when the plurality of bottom cover members are in the opened position.

* * * * *